United States Patent [19]

Fujimura et al.

[11] Patent Number: 4,676,425
[45] Date of Patent: Jun. 30, 1987

[54] STEEL TUBE WORKING APPARATUS

[75] Inventors: Hiroshi Fujimura; Hideharu Kobayashi; Shozo Kaneko; Atsumasa Iwanaga; Joji Ichinari, all of Nagasaki, Japan

[73] Assignee: Mitsubishi Jukogyo Kabushiki Kaisha, Tokyo, Japan

[21] Appl. No.: 805,296

[22] Filed: Dec. 5, 1985

[30] Foreign Application Priority Data

Dec. 12, 1984 [JP] Japan ................................ 59-260649
Dec. 14, 1984 [JP] Japan ................................ 59-262853
Dec. 17, 1984 [JP] Japan ................................ 59-266002
Dec. 19, 1984 [JP] Japan ................................ 59-266487

[51] Int. Cl.4 .......................................... B23K 37/02
[52] U.S. Cl. .................................... 228/45; 414/746; 29/726; 219/60 A; 228/102; 901/28; 901/42
[58] Field of Search .................. 901/28, 41, 42, 32; 414/745, 746; 29/726; 228/102, 13, 170, 45; 219/60 A, 137 R

[56] References Cited

U.S. PATENT DOCUMENTS 4,169,758 10/1979 Blackstone et al. ............. 901/42 X
4,176,269 11/1979 Merrick et al. .................. 219/60 A
4,238,663 10/1980 Calhoun et al. ................. 219/60 A
4,440,339 4/1984 Tamai et al. ..................... 228/170 X
4,545,569 10/1985 Schroder et al. ................ 901/42 X Primary Examiner—Kenneth J. Ramsey
Attorney, Agent, or Firm—Wenderoth, Lind & Ponack

[57] ABSTRACT

A steel tube working apparatus is composed of a clamping device consisting of a pair of clamps, a pair of projecting plates, means for actuating the clamps and the projecting plates, a pair of guide bars and a main body frame; a base plate having a pair of guide rollers fitting to the guide bars fixedly secured to its opposite ends; and working means connected to the base plate in a movable and rotatable manner. A cutting device, a beveling device, a welding device, etc. are selectively connected to the base plate as the working means.

15 Claims, 29 Drawing Figures

STEEL TUBE WORKING APPARATUS

BACKGROUND OF THE INVENTION:

1. Field of the Invention

The present invention relates to a steel tube working apparatus that is especially available for repair of superheater tubes in a boiler, reheater tubes in the same, various types of heat-exchanger tubes, reinforcements, etc., and also to a clamping device, a welding device and a cutting device for use in the same steel tube working apparatus.

2. Description of the Prior Art

Describing now with respect to repair of a damaged location of a superheater panel constructed by arraying a plurality of tubes in a planar shape, by way of example, in a superheater of a boiler, as shown in FIG. 14 the superheater is formed by arraying several hundreds for each of superheater panels 01 at a narrow pitch. To the respective tubes forming the panel are connected pendant pipes 02, 03 and 04 by welding or mechanical means to hold the planar shape of the pane, and the pendant pipes are connected to a ceiling portion of the boiler to support the panel. An inlet header 05 consisting of a cylindrical pressure container and a similar outlet header 06 are secured by welding to the respective tubes in the panel so that they can be respectively communicated with each other. Steam is supplied from a piping system not shown to the inlet header 05 to be distributed among the respective tubes. After heat absorption has been effected, the steam is collected in the outlet header 06, and subsequently it drives turbines or other steam engines, or else it is used in a heating apparatus.

However, during use of the tubes in the above-described heater panel for a long period of time, damage would be generated therein due to aged deterioration or corrosion in material, and consequently, it becomes necessary to partly cut away the damaged tube and to substitute a new tube therefor. But, in the superheater, since the tubes are arrayed inherently in a thickly crowded state for the purpose of increasing thermal efficiency, for instance, since the tube interval within the superheater panel 01 is about 30 mm, an interval between the adjacent panels is about 60 mm, and thus the tubes are arrayed very close to each other, in the event that damage should arise at a certain portion of a group of tubes, it would be impossible for a worker to obtain access to the damaged location, and in such a case, it has previously been necessary to employ a method in which a superheater panel 01a including the damaged tube is cut away at its connecting portions 07 with pendant pipes 02a, 03a and 04a and the respective headers 05 and 06, respectively, then the cut panel 01 is hanged up and removed as by a winch not shown, and subsequently, after the damaged tube has been repaired, the panel 01 is restored to the original position. Accordingly, in the above-described method in the prior art, for only one damaged location it was necessitated to cut sound pendant pipes and amount portions between the panel and the headers at several tens of locations and to again weld all the cut locations after completion of repair of the damaged locations for restoring the panel to its original location. To the end an enormous time and expense was spent for repair of only one damaged location, and moreover, there was a problem that quality and reliability of the superheater itself was greatly degraded due to cutting, and welding for restoration of essentially sound portions.

SUMMARY OF THE INVENTION

It is therefore one object of the present invention to provide a steel tube working apparatus which can achieve repair of a damaged tube among thickly crowded tubes such as superheater tubes in a boiler without cutting away a tube panel including the damaged tube.

According to one feature of the present invention, there is provided a steel tube working apparatus comprising clamp means in which a pair of clamps that can be advanced and retracted, a pair of projecting plates that can be expanded and contracted, means for actuating the clamps and the projecting plates and a pair of guide bars which are mounted on a main body frame, a base plate having a pair of guide rollers fitting to the guide bars fixedly secured to its opposite ends, and working means connected to the base plate in a movable and rotatable manner.

According to the present invention, by making use of the above-featured steel tube working apparatus, the opposite sides of a damaged location of a damaged tube are respectively firmly gripped by the clamps in two sets of fixing jigs, the damaged tube is cut away by means of cutting machines fixed to the guide bars provided standing from the fixing jigs on the respective sides with the guide rollers at their opposite ends fitted to the guide bars, subsequently beveling work is effected to the cut ends by means of beveling machines fixedly secured to the respective fixing jigs in place of the cutting machines, then after the beveling machines have been removed, a newly replaced tube is inserted to the cut-away portion and is firmly gripped by the clamps as aligned with other portions of the tube, and finally, the newly replaced tube is fixedly secured by welding by means of welding machines similarly fitted and fixed to the fixing jigs. The above-mentioned various operations can be remotely controlled.

Therefore, with the present invention, a damaged tube can be cut away by means of cutting machines noninterferentially fitted and fixed to fixing jigs which are uninterferentially inserted on the opposite sides of a damaged tube in a thickly crowded group of tubes and are made to firmly grip the tube, the cut end can be beveled by beveling machines which are similarly fitted and fixed, in addition, a newly replaced tube firmly gripped by clamps as aligned with other tubes can be fixedly secured by welding by means of welding machines which are similarly fitted and fixed, and thus repair of the damaged tube can be achieved through remote control.

The above-mentioned and other objects, features and advantages of the present invention will become more apparent by reference to the following description of preferred embodiments of the invention taken in conjunction with the accompanying drawings.

DETAILED DESCRIPTION OF THE PREFERRED EMBODIMENTS

Figure 1:
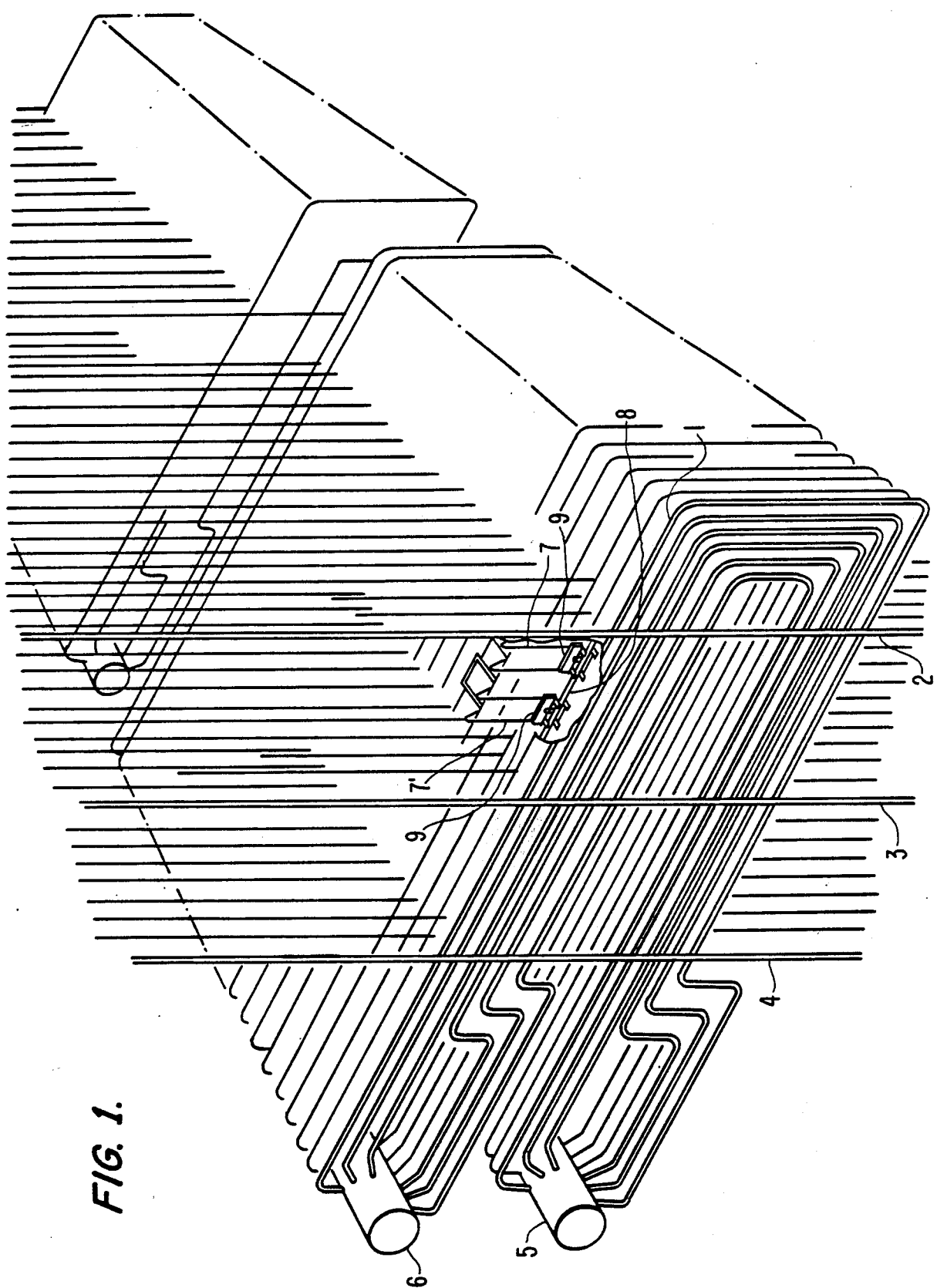
FIG. 1 is a perspective view showing one preferred embodiment of the present invention.
Figure 2:
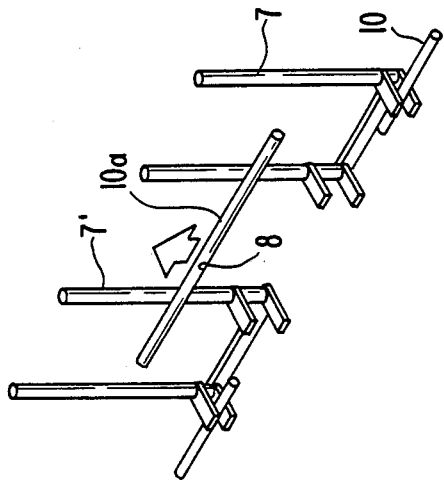
FIGS. 2, 3, 4, 5, 6 and 7, respectively, are perspective views showing the successive steps in a repairing process making use of the same preferred embodiment.
Figure 5:
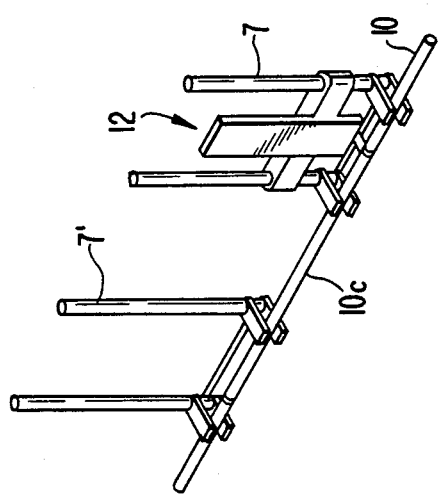
Figure 3:
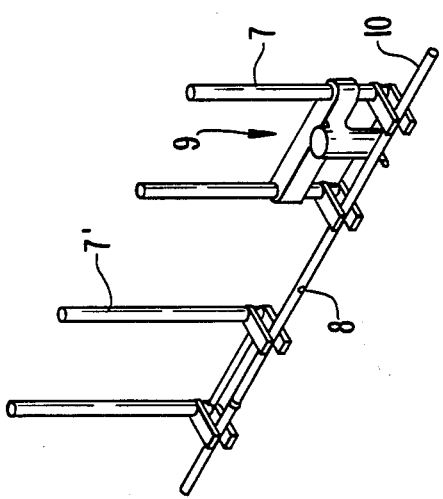
Figure 6:
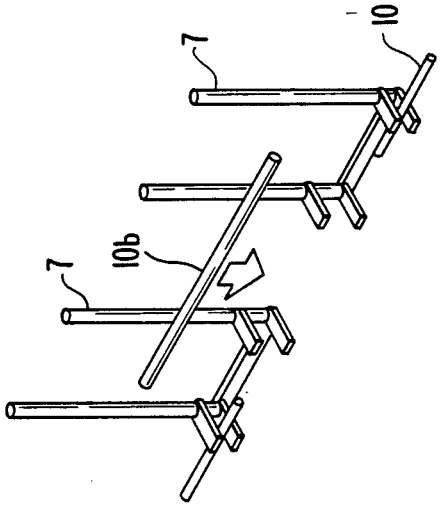
Figure 4:
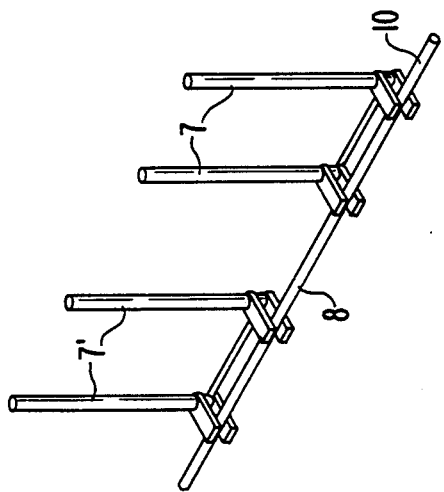
Figure 7:
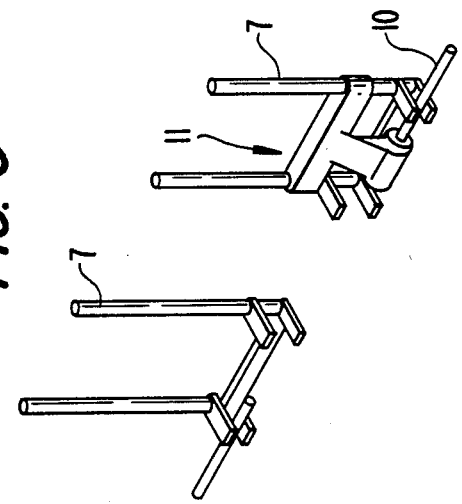

Now, one preferred embodiment of the present invention will be described with reference to FIGS. 1 to 13. At first, briefly describing a method for repairing a damaged superheater panel which can be carried out without cutting away the damaged panel by making use of a steel tube working apparatus according to the present invention with reference to FIGS. 1 to 7, several hundreds of superheater panels 1 are suspended and supported by pendant pipes 2, 3 and 4, and an inlet header 5 and an outlet header 6 are fixedly secured by welding to the respective ones of the tubes forming the superheater panel 1. In the event that a damaged section 8 has been produced in an object tube 10 among the above-mentioned tubes, as shown in FIG. 3 two pairs of fixing jigs 7 and 7' as will be described later are inserted into a gap space between the panel in question and an adjacent panel at the positions on the opposite sides of the damaged section 8 of the tube 10, respectively, to make them firmly grip the tube 10, subsequently cutting machines 9 and 9' as will be described later are fixedly mounted on the both fixing jigs 7 and 7' on the opposite sides to make the cutting machines cut the object tube 10 at the positions between the respective fixing jigs on the opposite sides, and after the firm gripping of the fixing jigs on the side near to the damaged section 8 has been released, the cut away tube 10a is pulled up by means of a rope or a handling tool not shown. Subsequently, after the cutting machines have been removed, beveling machines 11 and 11' as will be described later are fixedly mounted to the fixing jigs to perform beveling of the cut ends of the object tube 10, after completion of the beveling work the beveling machines are removed, then the size of the lost portion of the object tube is calculated and determined on the basis of the size of the cut away tube 10a, a cutting margin and a beveling margin, a new replacing tube 10b which has been cut into the determined size and subjected to beveling is inserted into the cut-away space similarly by means of a rope or the like, then it is fitted in the opened portions of the fixing jigs to make them firmly grip it, after welding machines 12 and 12' as will be described later have been fixedly mounted to the fixing jigs similarly to the above, the engaged portions between the new replacing tube and the object tube are welded by the welding machines 12 and 12', and subsequently, when the welding machines have been removed, the repair is finished.

Figure 8:
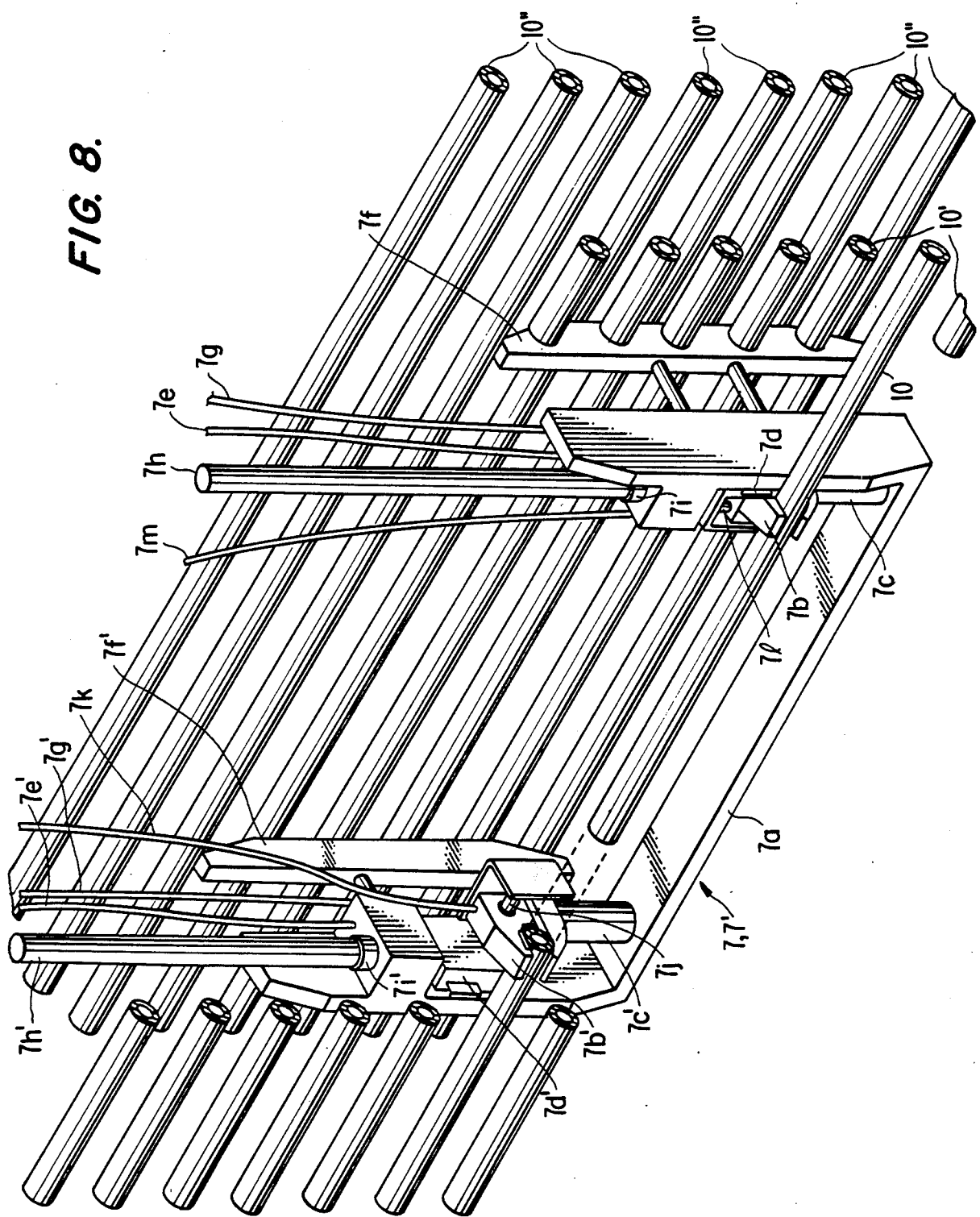
FIG. 8 is a perspective view showing a fixing jig in the same preferred embodiment.

The above-described fixing jigs 7 and 7' respectively have a symmetric configuration as shown in FIG. 8, an object tube 10 which necessitates repair forms, jointly with other tubes 10', a same panel, and this panel is adjacent to another panel formed of other tubes 10". This fixing jig consists of a jig main body frame 7a and clamps 7b and 7b' disposed at the opposite ends of the main body frame 7a so as to be arbitrarily made to firmly grip a tube. Projecting plates 7f and 7f' are mounted on the main body frame in an expansible and contractible manner so that the expansion and contraction thereof can be freely controlled by flexible shafts 7g and 7g', gripping and releasing operations of the clamps are freely controlled by means of hydraulic or pneumatic cylinders 7c and 7c', moving mechanisms 7d and 7d' for moving the clamps back and forth with respect to the main body frame are driven by flexible shafts 7e and 7e' so as to be arbitrarily moved. Also, on the opposite sides of the main body frame are provided guide bars 7h and 7h', respectively, as standing therefrom, at the ends of the guide bars are mounted stoppers 7i and 7i' for positioning cutting machines 9 and 9' as will be described later, a left and right moving mechanism 7j for moving the above-mentioned clamp in the left and right directions is driven by a flexible shaft 7k so as to be arbitrarily moved, and a vertically moving mechanism 7l for moving the above-mentioned clamp in the vertical directions is driven by a flexible shaft 7m so as to be arbitrarily moved.

Figure 9:
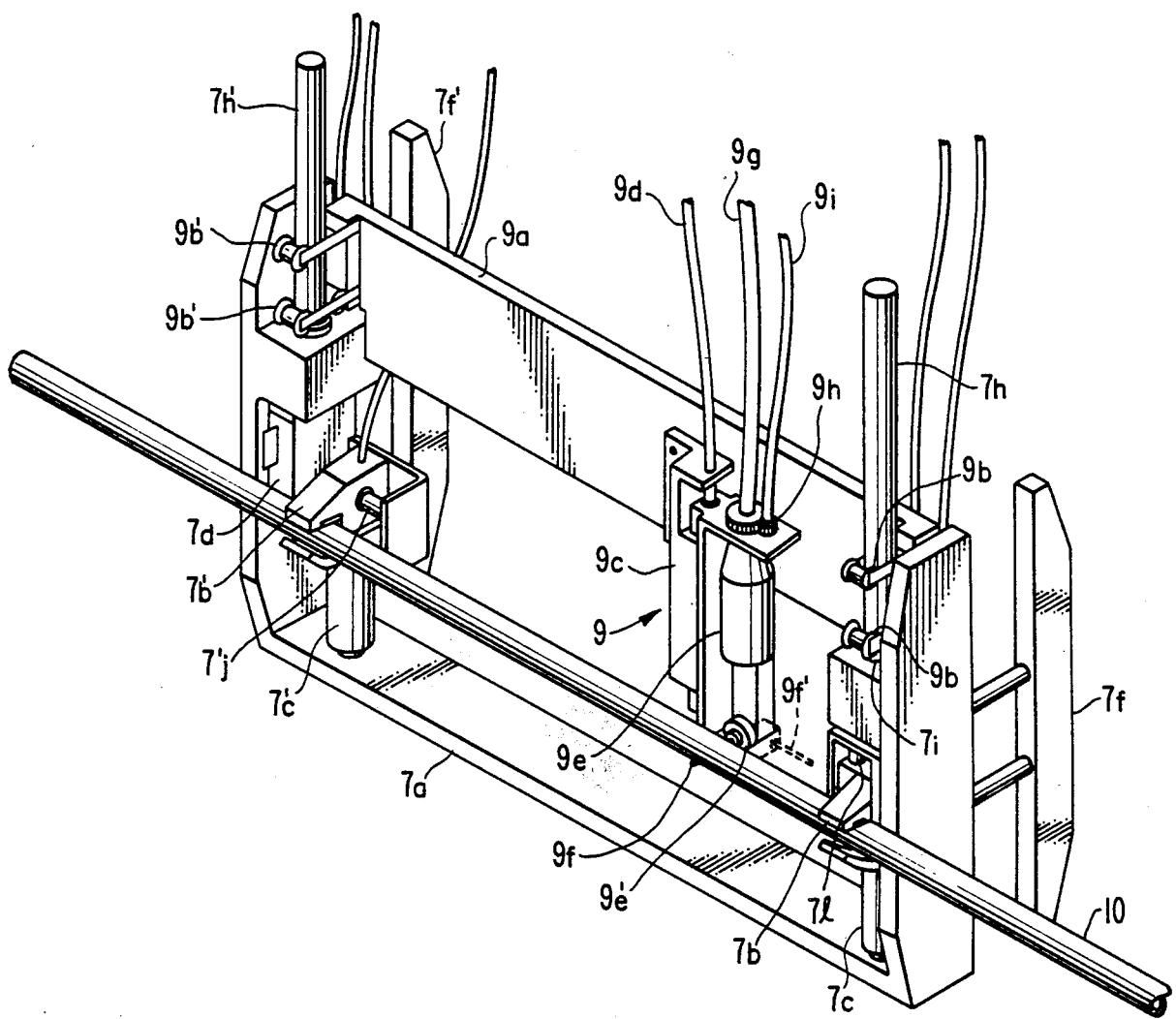
FIG. 9 is a perspective view showing a cutting machine in the same preferred embodiment.

In each of the above-described cutting machines 9 and 9', as shown in FIG. 9, a pair of guide rollers 9b and 9b' are disposed at the opposite ends of a cutting machine end plate 9a, a vertically moving table 9c is disposed on the same cutting machine base plate 9a so as to be moved up and down arbitrarily by actuating a flexible shaft 9d, a pneumatic motor 9e having an end mill 9f mounted at its tip end and connected to a driving air hose 9g, is rotatably mounted on the vertically moving table 9c, and control for the rotating the pneumatic motor 9e can be arbitrarily performed by driving a gear mechanism 9h associated with the pneumatic motor 9e by a flexible shaft 9i. Accordingly, upon cutting a damaged tube 10', the pneumatic motor 9e and the end mill 9f are rotated by 90° to the positions shown by dotted lines as a pneumatic motor 9e' and an end mill 9f', then while they are held at these angular postions the vertically moving table 9c is lowered until the end mill 9f comes under the object tube 10 to be cut through the space between the adjacent panels without interfering with the tubes 10' and 10" in the respective adjacent panels, and thereafter the pneumatic motor 9e' and the end mill 9f' are rotated by 90° to the positions shown by solid lines to make the end mill 9f engage with the tube 10 to be cut.

Figure 10:
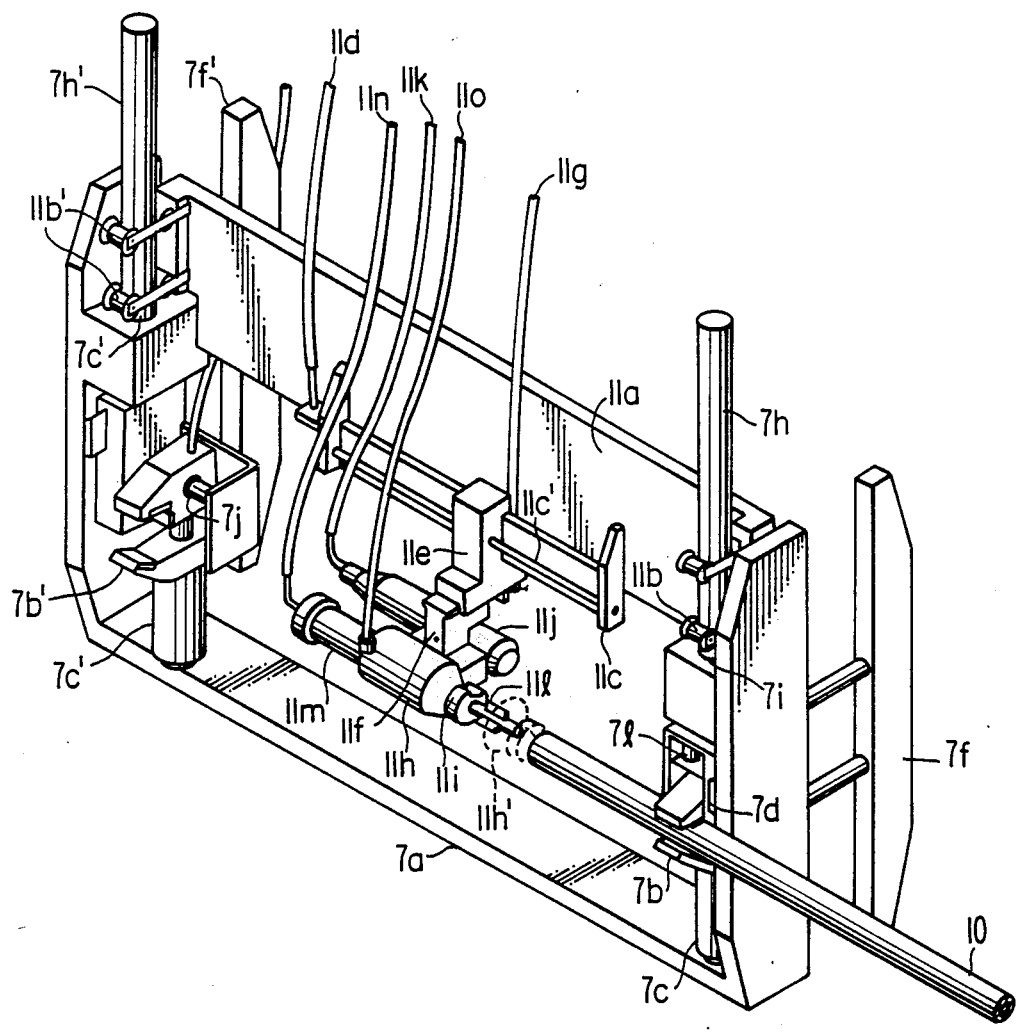
FIG. 10 is a perspective view showing a beveling machine in the same preferred embodiment.

In each of the beveling machines 11 and 11', as shown in FIG. 10, a pair of guide rollers 11b and 11b' are disposed at the opposite ends of a beveling machine base plate 11a, a left and right moving table 11c is fixedly mounted on the same beveling machine base plate 11a so that a screw rod 11c' in the table 11c can be rotated by remote control through a flexible shaft 11d. A back and forth moving table 11e is threadedly engaged with the screw rod 11c' so that the back and forth moving table 11e can be arbitrarily moved in the left and right directions by rotating the screw rod 11c', a movable table 11f is fitted in the back and forth moving table 11e so that the movable table 11f can be moved back and forth by remote control through a flexible shaft 11g, a milling machine 11h is fixedly mounted on the movable table 11f, a cutting tool 11i is firmly gripped by an internal chuck 11l at a tip end of a pneumatic motor 11j (an electric or hydraulic motor could be used equally) of the milling machine 11h to rotate the tool by the pneumatic motor via a gear train, a driving air hose 11k is connected to the pneumatic motor 11j, furthermore, the internal chuck 11l can be arbitrarily extended or contracted by means of a hydraulic or pneumatic cylinder 11m connected to a driving hydraulic or pneumatic hose 11n, and by connecting a flexible shaft 11o to a worm gear and a screw feed mechanism within the pneumatic motor section, cutting feed in which the cutting tool is advanced with respect to the internal chuck 11l, can be done arbitrarily.

Figure 11:
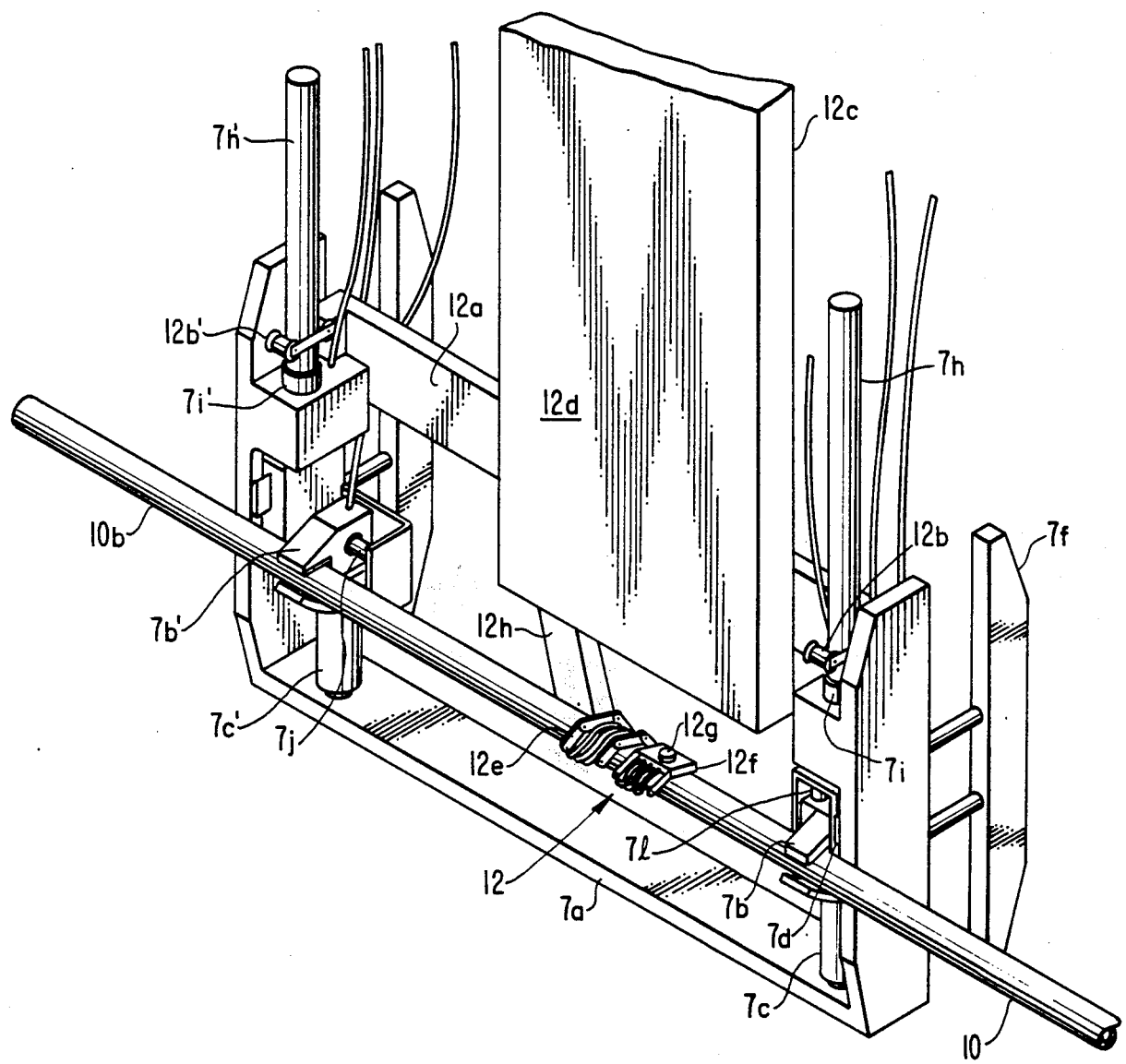
FIG. 11 is a perspective view showing a welding machine in the same preferred embodiment.
Figure 12:
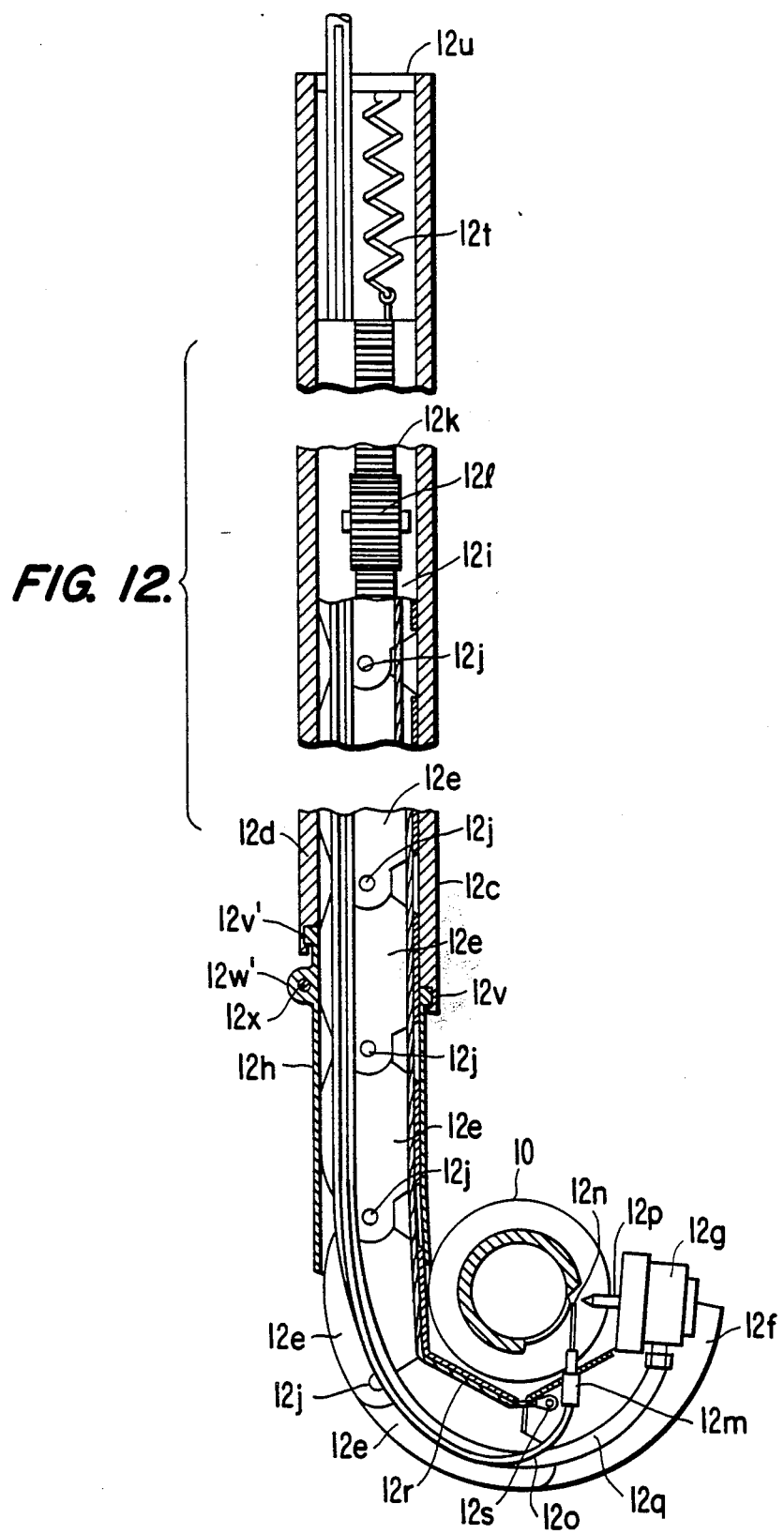
FIG. 12 is an enlarged longitudinal cross-section a view of a base plate portion of the welding machine.
Figure 13:
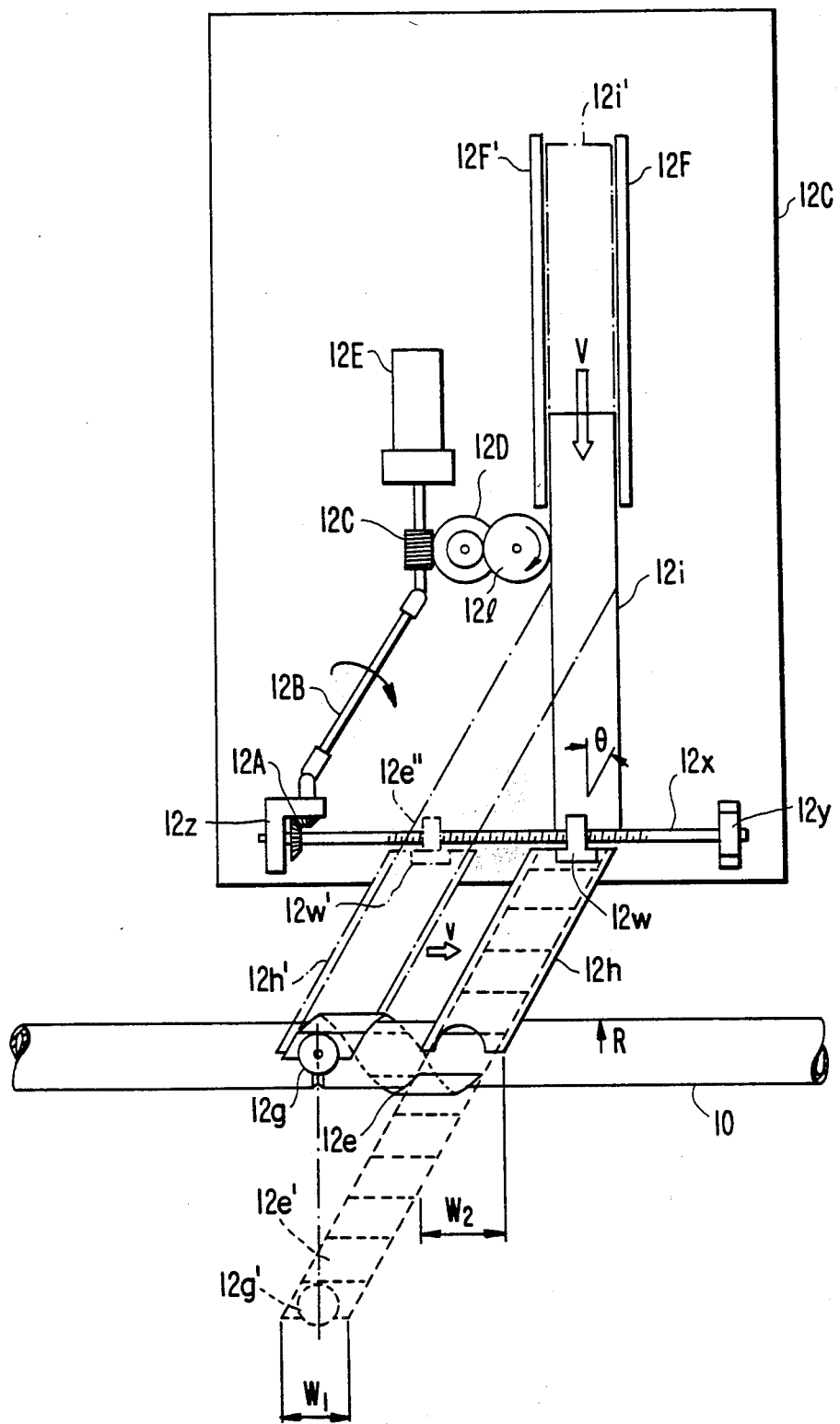
FIG. 13 is a conceptional view showing operations of articular bodies and the like in the same welding machine.
Figure 14:
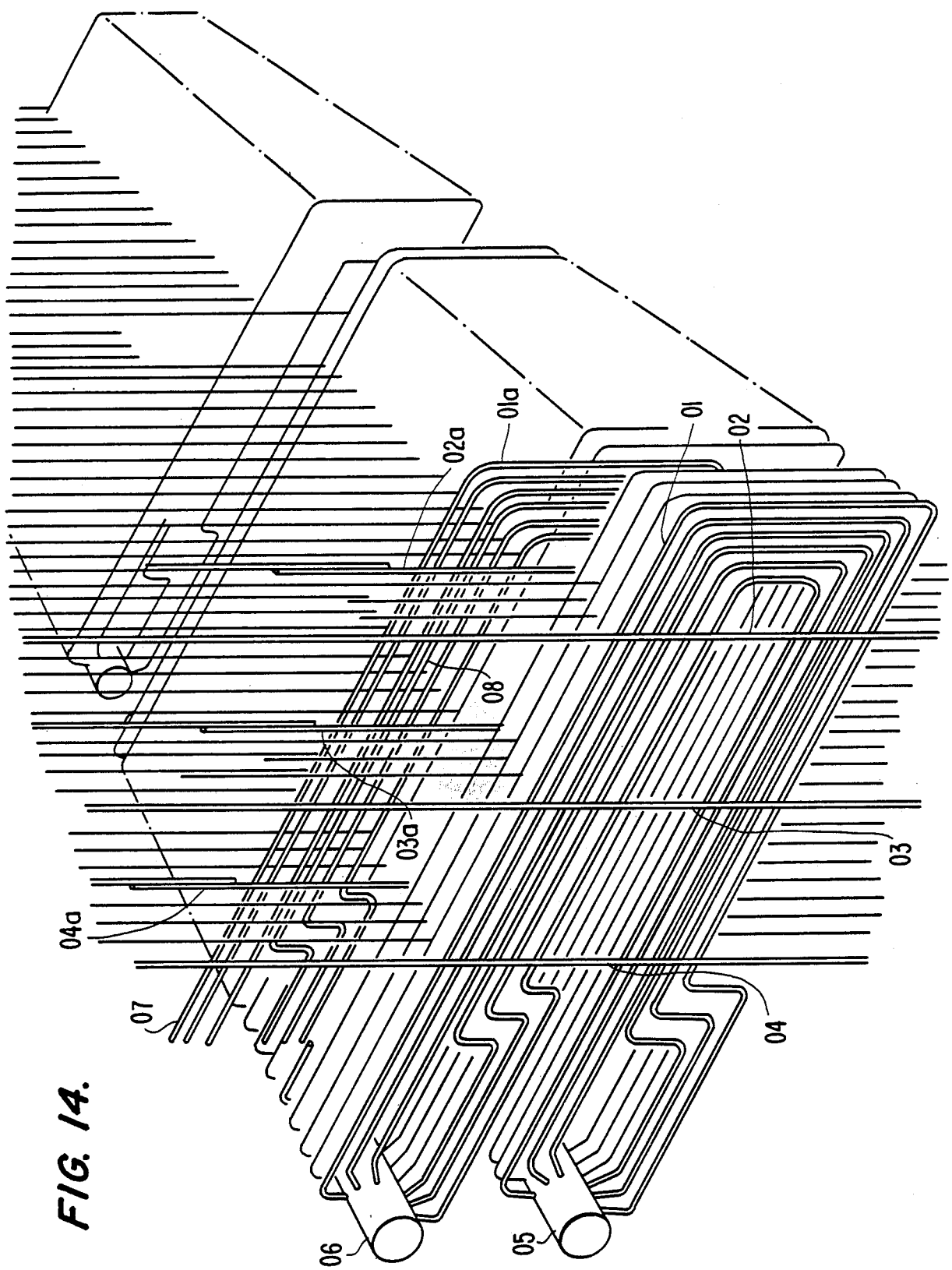
FIG. 14 is a perspective view showing superheater panels in the prior art.

In each of the above-described welding machines 12 and 12', as shown in FIGS. 11, 12 and 13, a pair of guide rolers 12b and 12b' are disposed at the opposite ends of a welding machine holding plate 12a, a welding machine base plate 12c covered by a cover member 12d is fixedly mounted on the same welding machine holding plate 12a, a sheath 12h is provided projecting from the base plate 12c, within the sheath 12h are disposed a plurality of articular bodies 12e having a torch holder 12f mounting a welding torch 12g thereon pivotably secured to their tip end, and the articular bodies can be arbitrarily paid out. The respective ones of the above-mentioned articular bodies and torch holder are flexibly connected by means of a plurality of pins 12j, the other end of the articular bodies is connected to a slide rod 12i for paying out the articular bodies, and a rack 12k engaged with a pinion 12l rotated by a motor not shown, is fixedly secured to the slide rod 12i. In addition, a filler wire 12n within a conduit cable 12o is projected from a filler wire tip holder 12m towards a welding portion of the object tube 10 to be welded, also a tungsten electrode 12p is projected from the above-mentioned welding torch 12g towards the same portion, furthermore a cable hose 12q is connected to the welding torch 12g to feed electric power and inert gas, and a drawing cable 12r applied with a tension by a spring 12t is fixed to the above-described torch holder 12f by means of a fixing metal 12s, the remote end of the spring 12t being fixedly connected to a spring fixing table 12u provided on the base plate 12c at the end of the cover 12d. At the bottom of the base plate 12c and the cover 12d are disposed slide mechanisms 12v and 12v', to make the above-mentioned sheath 12h freely slidable, and in the sheath 12h is fixedly provided a feed nut 12w which is engaged with a feed screw that is driven by a motor not shown. Describing in more detail with reference to the conceptional view in FIG. 13, the feed screw 12x is supported at its opposite ends by bearings 12y and 12z, a bevel gear mechanism 12A provided at one end of the shaft of the feed screw 12x is coupled to a connecting rod 12B, which is in turn connected to a gear shaft of a worm gear 12C that is rotationally driven by a drive motor 12E, and the worm gear 12C is engaged via an intermediate gear 12D with the above-mentioned pinion 12l, so that the pinion 12l and the feed screw 12x can be rotated in response to actuation of the drive motor 12E. The rotation of the pinion 12l results in pay-out of the articular bodies 12e via the slide rod 12i as described above, while the rotation of the feed screw 12x causes the feed nut 12w engaged with the feed screw 12x to move along the feed screw 12x, so that the slide rod 12i moves in the direction of an arrow at a moving velocity V along directional guide slide plates 12F and 12F' starting from its initial state 12i', the sheath 12h moves in the direction of an arrow at a moving velocity v starting from its initial state 12h', and the feed nut 12w moves starting from its initial state 12w'. In this connection, in the state 12e' where it is assumed that the articular bodies 12e do not wind themselves around the object tube 10, the welding torch 12g comes to the position 12g', and the angle formed between the slide rod 12i and the articular bodies 12e' is represented by θ.

Now, describing the cutting performed on the object tube 10 by making use of the above-described fixing jigs and cutting machines, at first mounting of the fixing jig 7 is carried out in the following manner. With reference to FIG. 8, after the clamps 7b and 7b' and the projecting plates 7f and 7f' have been respectively retracted, the fixing jig 7 is inserted between the superheater panel 1 including the object tube 10 and the adjacent superheater panel to make the above-described clamps 7b and 7b' exactly oppose the object tube 10. Subsequently if the above-mentioned projecting plates 7f and 7f' are extended by manipulating the flexible shafts 7g and 7g' to cause the projecting plates 7f and 7f' and the main body frame 7a to push against the tubes 10, 10' and 10" in the adjacent panels, then fixing of the fixing jig 7 can be accomplished, hence after the above-described clamps 7b and 7b' have been advanced by manipulating the flexible shafts 7e and 7e', the hydraulic or other cylinders 7c and 7c' are actuated to make the clamps 7b and 7b' firmly grip the object tube 10. Subsequently, mounting of the cutting machine 9 to the above-described fixing jig 7 is carried out in the following manner. With reference to FIG. 9, the cutting machine 9 is inserted between the superheater panel 1 including the object tube 10 and the adjacent superheater panel with the guide rollers 9b and 9b' of the cutting machine 9 fitted to the guide bars 7h and 7h', respectively, of the fixing jig 7, and during that time since the insertion is effected with the pneumatic motor 9e and the end mill 9f rotated by 90° so as not to interfere with the adjacent panels as described previously, the insertion can be achieved smoothly. When the cutting machine 9 has been inserted until it reaches the stoppers 7i and 7i' on the guide bars 7h and 7h' and stops, the cutting machine 9 is fixed to the fixing jig 7. Since the distance between the clamp and the stopper is preliminarily known, it is possible to preliminarily adjust the vertically moving table 9c of the cutting machine 9 so that at the fixed position of the cutting machine 9 the end mill 9f may be positioned between the object tube 10 and the next lower tube 10', hence if the pneumatic motor 9e is thereafter rotated by 90° by manipulating the flexible shaft 9i, then the end mill 9f can be inserted between the above-described tubes 10 and 10' and directed in the direction perpendicular to the center axis of the object tube 10, and therefore, if the vertically moving table 9c is moved upwards while the pneumatic motor 9e is rotated jointly with the end mill 9f by the air fed through the driving air hose 9g, the end mill 9f can cut the object tube 10 through a milling operation.

Now, describing the beveling work performed on the cut end of the object tube 10 by making use of the above-described beveling machine, with reference to FIG. 10, at first the beveling machine 11 is fixedly mounted on the fixing jig 7 after the cutting machine 9 has been removed therefrom. At the time, similarly to the above-described mounting of the cutting machine 9, the beveling machine 11 is inserted between the panel 1 including the object tube 10 and the adjacent panel while the guide rollers 11b and 11b' of the beveling machine 11 are fitted to the guide bars 7h and 7h' of the fixing jig 7. At this time, since the insertion is effected after the milling machine 11h has been retracted jointly with the movable table 11f fitted in the back and forth moving table 11e by manipulating the flexible shaft 11g, the beveling machine can be inserted smoothly without interfering with the tubes 10, 10' and 10" in the adjacent panels. Subsequently, the insertion is continued until the beveling machine 11 is fixed to the fixing jig 7 similarly to the above-described case of the cutting machine. Since the distances between the clamps 7b and 7b' and the stoppers 7i and 7i', respectively, in the fixing jig are preliminarily known, at the fixed position of the beveling machine, the vertical position of the rotary shaft of the above-described milling machine can be matched with the center axis of the object tub 10, thereafter the rotary shaft of the milling machine is aligned with the center axis of the object tube 10 by advancing the movable table 11f by manipulating the flexible shaft 11g. Next, if the screw rod 11c' of the left and right moving table 11c is rotated by manipulating the flexible shaft 11d, then the back and forth moving table 11e, the movable table 11f and the milling machine 11h would move in the rightward direction as a whole, so that the internal chuck 11l is inserted into the aforementioned object tube 10. Therefore, if the internal chuck is extended by the hydraulic or other cylinder 11m, then the milling machine is fixed to the end portion of the object tube 10 in the state shown at 11h' by dotted lines, subsequently if the milling tool 11i is advanced by manipulating the flexible shaft 11o while rotating the milling tool 11i by feeding air through the air hose 11k to the pneumatic motor 11j, then beveling is effected at the end portion of the object tube 10.

Still further, describing the work of securing by welding a new replacing tube to the cut end of the object tube by making use of the above-described welding machine, with reference to FIGS. 11, 12 and 13, after the beveling machine 11 having finished beveling has been removed, a welding machine 12 is inserted between the superheater panel 1 including the damaged tube 10 and the adjacent panel while the guide rollers 12b and 12b' are fitted to the guide bars 7h and 7h' of the fixing jig 7 similarly to the mounting of the beveling machine 11. In this case, if the insertion is effected in the state where the articular bodies 12e are accommodated within the sheath 12h, then the insertion can be achieved smoothly without interference between the articular bodies 12e, torch holder 12f and welding torch 12g and the tubes 10, 10' and 10", and after the insertion has been continued, the welding machine 12 is fixed to the fixing jig 7 similarly to the above-described beveling machine 11. In addition to the fact that the distances between the clamps 7b and 7b' and the stoppers 7i and 7i', respectively, in the fixing jig 7 are preliminarily know, the horizontal distance between the guide rollers of the welding machine 12 and the tip end of the sheath 12h is also known, and so, the welding machine 12 can be fixed at such position that the tip end of the sheath 12h may be engaged with the cut ends of the new replacing tube section 10b and the object tube 10. Subsequently, if the pinion 12l is driven by the motor 12E, then the slide rod 12i makes slide movement so as to pay out the articular bodies 12e from the sheath 12h. During this period, since the drawing cable 12r is always tensioned by the spring 12t, the respective articular bodies 12e tend to rotate about the pins 12j towards the side of the drawing cable 12r, while this rotation is suppressed until the articular body 12e in question comes out of the sheath 12h, once it has come out of the sheath 12h, it rotates until the bottom surface of the articular body 12e comes into contact with the surface of the object tube 10, hence the articular bodies 12e would wind themselves around the object tube 10, and thus jointly with the torch holder 12f at the tip end of the articular bodies 12e, the welding torch 12g and the filler wire tip holder 12m can revolve along the surface of the object tube 10 to be welded. Sooner or later, when the articular bodies 12e have wound themselves around the object tube to be welded nearly by one revolution, although FIG. 12 shows as if the tip end of the torch holder 12f might collide against the sheath 12h and might be prevented from winding themselves still further around the object tube 10, owing to the fact that the array of the articular bodies 12e is disposed obliquely with respect to the object tube 10 as shown in FIG. 13, after they have wound themselves around the object tube 10 by one revolution, the welding torch 12g would come to a different horizontal position from the sheath 12h, and thereby the mutual interference can be avoided. Accordingly, it is necessary to move the sheath 12h in the longitudinal direction of the object tube 10, and the mechanism for fulfilling this requirement is constructed in the following manner. That is, rotation of the motor 12E is transmitted to the pinion 12l via the worm gear 12C and the intermediate gear 12D to pay out the slide rod 12i in the direction of arrow V. At the same time, the rotation of the same motor is transmitted to the feed screw 12x via the connecting rod 12B and the bevel gear mechanism 12A, to move the sheath 12h jointly with the feed nut 12w in the direction of arrow v (FIG. 13). Now, by appropriately selecting numbers of teeth, pitches, etc. of the respective gears, the ratio V/v of the moving velocity V of the slide rod 12$i$ to the moving velocity v of the sheath 12$h$ can be made equal to a tangent value of the angle $\theta$ formed between the slide rod 12$i$ and the array of the articular bodies 12$e$, that is, equal to tan $\theta$. Therefore, the articular bodies can be always passed smoothly through the sheath 12$h$. In addition, since the array of the articular bodies 12$e$ is connected to the tip end of the slide rod 12$i$ at an angle of $\theta$ as described above, assuming that the articular bodies 12$e$ do not wind themselves around the object tube 10, when the slide rod 12$i$ is pushed out by the pinion 12$l$, the articular body 12$e$ would be displaced from the position 12$e$ in the case where it winds itself around the tube 10 to the position indicated by 12$e'$, so that the position of the welding torch 12$g$ is also displaced to the position indicated by 12$g'$ in the direction parallel to the direction of movement of the slide rod 12$i$, and to make this direction of displacement perpendicular to the direction of the object tube 10 is possible by appropriately selecting the direction of the base plate 12$c$ of the welding machine 12 with respect to the object tube 10. In addition, since the respective rotational axes of the articular bodies 12$e$ can be preset perpendicular to the direction of movement of the slide rod 12$i$, when the articular bodies 12$e$ wind themselves around the object tube 10 to be welded, the locus of the welding torch 12$g$ would follow a circumference on the object tube 10, and thus can coincide with the welding line.

As described above, by making use of the respective devices according to the present invention, repair work for the respective ones of object tubes within a thickly crowded group of tubes can be effected by remote manipulation from the outside of the tube group.

A clamping device according to a second aspect of the present invention comprises a pair of retractile clamps, a pair of guide bars and a pair of projecting plates. The clamping device is inserted into a thickly crowded group of tubes with the clamps retracted and the projecting plates accommodated therein, the clamps are made to advance at predetermined positions to grip an object tube, and at the same time, the clamping device itself is fixed by expanding the projecting plates to push the adjacent tubes. Subsequently, a cutting machine is inserted along the guide bars and fixed to cut a damaged tube portion.

The second aspect of the present invention will be described in greater detail in connection to a preferred embodiment thereof illustrated in the accompanying drawings.

Figure 16:
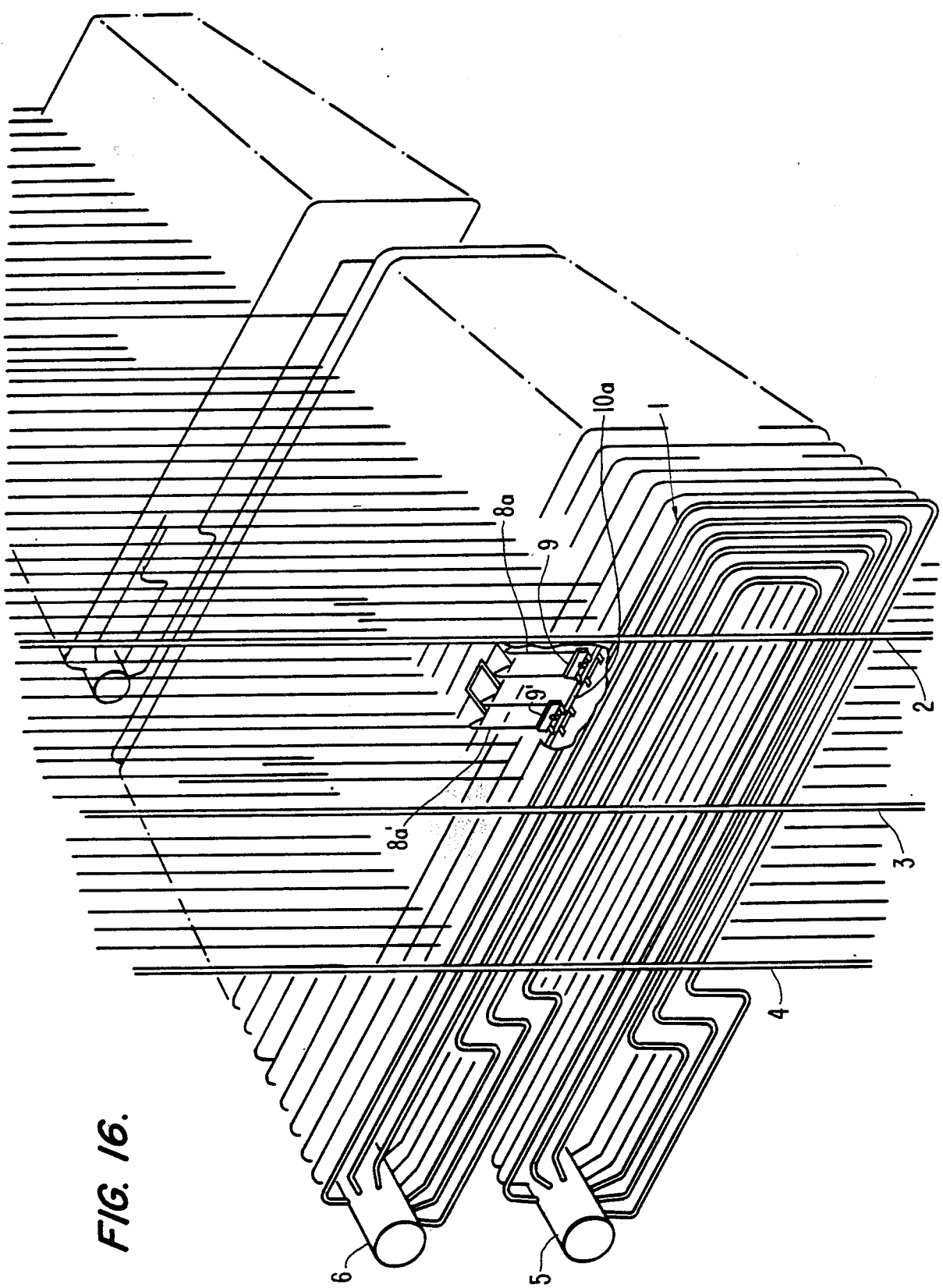
FIG. 16 is a perspective view showing the state where the present invention is applied to a superheater in a boiler.
Figure 17:
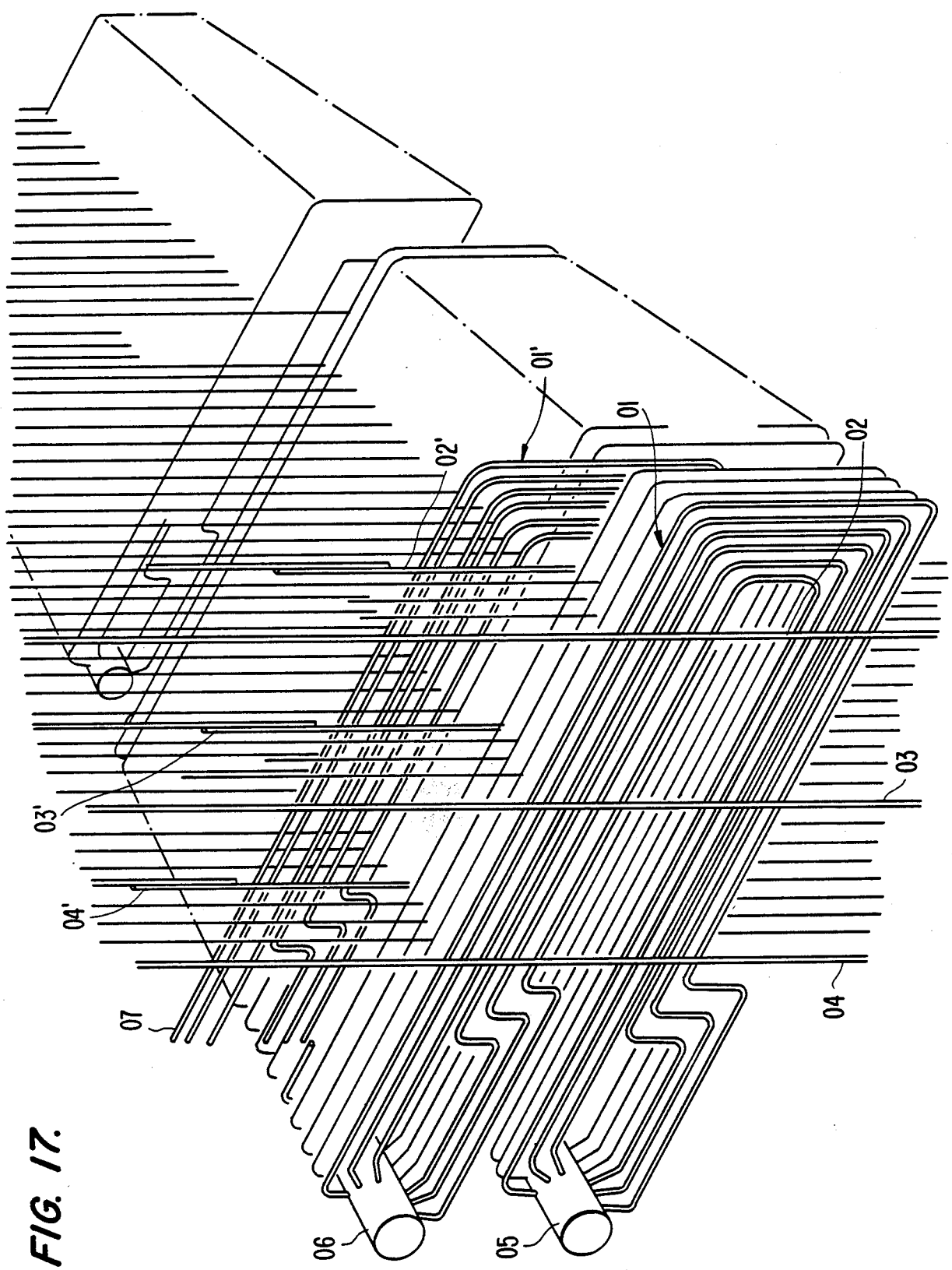
FIG. 17 is a perspective view showing a method for repairing a superheater panel in the prior art.

FIG. 16 shows the state where the clamping device according to the present invention is applied to a cutting work for a tube in a boiler superheater. In this figure, a superheater panel 1 is supported by pendant pipes 2, 3 and 4 suspended from a ceiling of a boiler. The superheater panel 1 is formed of a large number of tubes, and the respective tubes are communicated with an inlet header 5 and an outlet header 6. Reference numerals 8$a$ and 8$a'$ designate clamping devices according to the present invention, and a damaged portion 10$a$ of the tube is firmly gripped on its opposite sides by two sets of clamping devices 8$a$ and 8$a'$ inserted and fixed into a gap space between two adjacent superheater panels 1. Reference numerals 9 and 9$'$ designate cutting machines adapted to be fixedly mounted on the respective clamping devices 8$a$ and 8$a'$.

Figure 15:
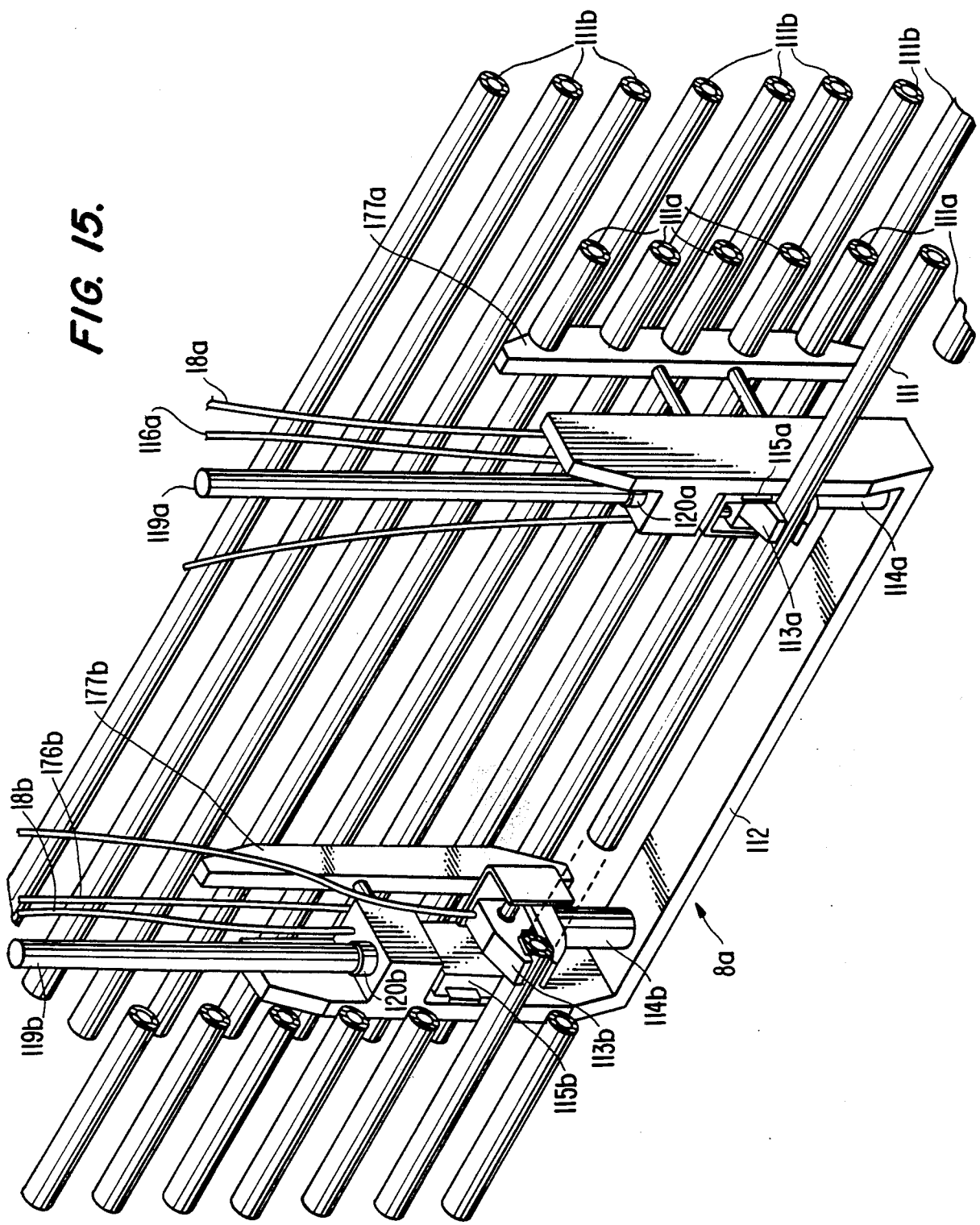
FIG. 15 is a perspective view of a clamping device according to the present invention.

A more detailed structure of the clamping device 8$a$ will be explained with reference to FIG. 15. Reference numeral 111 designates an object tube to be cut, numeral 111$a$ designates other tubes in the same panel as the tube 111, and numeral 111$b$ designates tubes in a panel adjacent to the panel including the object tube 111.

In the construction of the clamping device 8$a$, reference numeral 112 designates a main body frame, numerals 113$a$ and 113$b$ designate clamps, numerals 114$a$ and 114$b$ designate cylinders actuated by hydraulic or pneumatic pressure for opening and closing the respective clamps 113$a$ and 113$b$, numerals 115$a$ and 115$b$ designate moving mechanisms for moving the clamps 113$a$ and 113$b$ back and forth, numerals 116$a$ and 116$b$ designate flexible shafts for driving the moving mechanisms 115$a$ and 115$b$, numerals 117$a$ and 117$b$ designate projecting plates mounted to the main body frame 112 in an expansible and contractible manner, numerals 118$a$ and 118$b$ designate flexible shafts for controlling expansion and contraction of the projecting plates 117$a$ and 117$b$, numerals 119$a$ and 119$b$ designate guide bars fixedly secured to the main body frame 112, and numerals 120$a$ and 120$b$ designate stoppers.

In FIG. 16, steam supplied to the inlet header 5 is distributed among the respective tubes in the superheater panel 1, and after having absorbed heat, the steam is collected in the outlet header 6, then it is supplied to a turbine, a steam engine, a heating apparatus or the like. Since the gap space between the adjacent superheater panels 1 is very narrow, it is impossible for a worker to enter the gap space, but the clamping device according to the present invention can be inserted into the gap space.

Now referring again to FIG. 15, the main body frame 112 is inserted between the superheater panels 1 with both the clamps 113$a$ and 113$b$ and the projecting plates 117$a$ and 117$b$ retracted, until the clamps 113$a$ and 113$b$ reach the positions opposed to the object tube 111.

Under this condition, if the projecting plates 117$a$ and 117$b$ are expanded by manipulating the flexible shafts 118$a$ and 118$b$, then the array of the tubes 111$a$ and the array of the tubes 111$b$ are pressed by the projecting plates 117$a$ and 117$b$ and the main body frame 112, and thereby the main body frame 112 can be fixed in position.

Subsequently, the clamps 113$a$ and 113$b$ are advanced by manipulating the flexible shafts 118$a$ and 118$b$, and pneumatic pressure or hydraulic pressure is applied to the cylinders 114$a$ and 114$b$ so that the clamps 113$a$ and 113$b$ may grip the object tube 111. Then the tube 111 is perfectly fixed and becomes stationary. Next, although not illustrated in FIG. 15, the tube 111 can be cut by means of a cutting machine.

With the clamping device according to the present invention, an object tube within a thickly crowded group of tubes can be gripped from outside of the tube group by remote control. Therefore, if the opposite sides of a damaged portion of the object tube are cut by means of cutting machines 9 and 9$'$ which can be inserted into a narrow gap space as shown in FIG. 16, then the damaged portion can be separated and taken out in preparation to subsequent works such as beveling work, insertion of a new tube portion, welding work and the like.

As described above, if the clamping device according to the present invention is used, gripping of a tube which is necessitated for repair work in a thickly crowded group of tubes, can be achieved externally by remote manipulation. Hence, the enormous time and expense spent in a repair work in the prior art for a worker to made access to an object location, can be greatly reduced, and moreover, degradation of quality of the object products can be suppressed to a minimum.

Now, a third aspect of the present invention will be described in detail in connection to one preferred embodiment thereof illustrated in the accompanying drawings.

Figure 22:
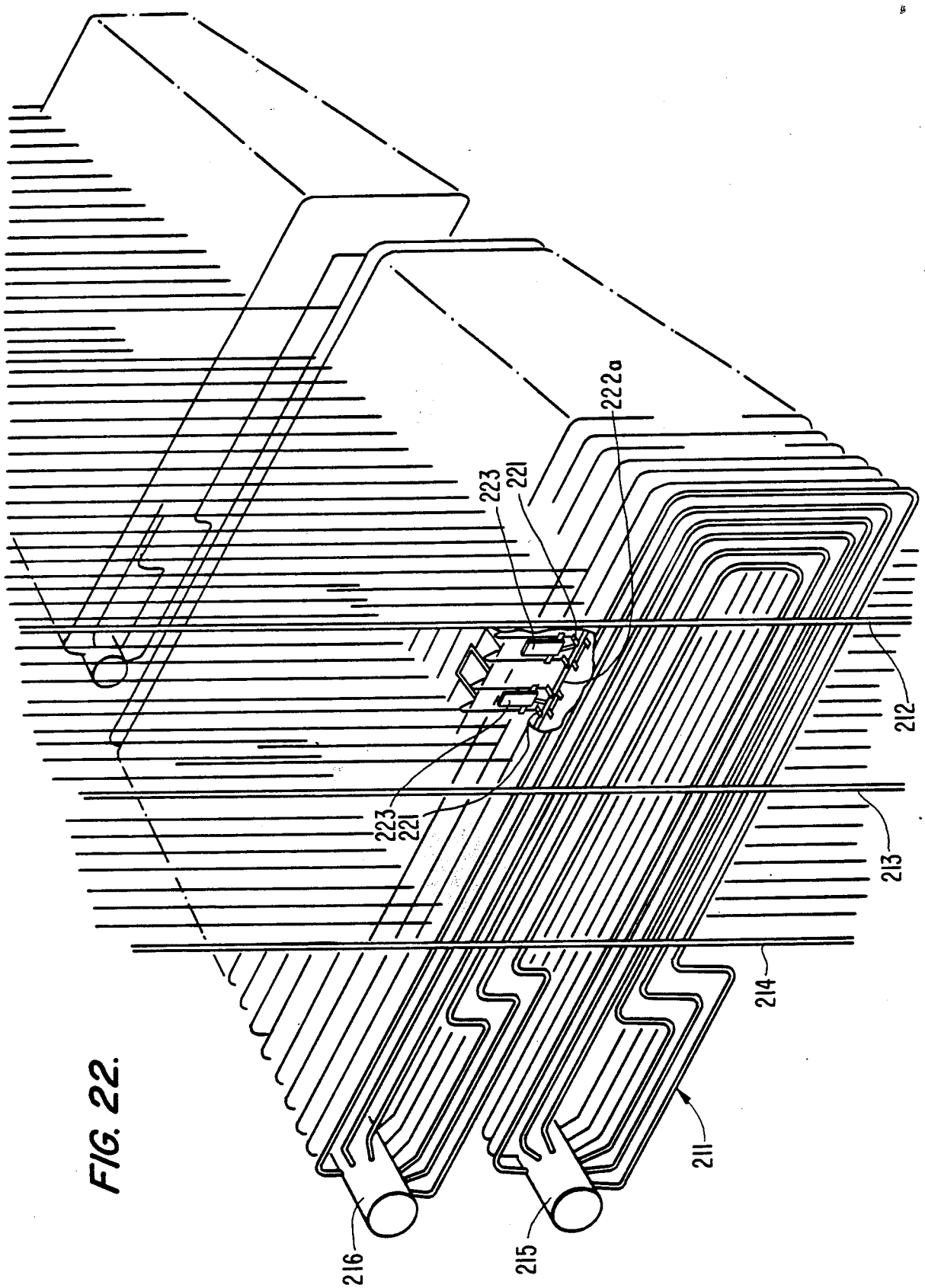
FIG. 22 is an overall general perspective view showing the state where the apparatus according to the present invention is applied to a welding work for a tube in a boiler superheater.
Figure 23:
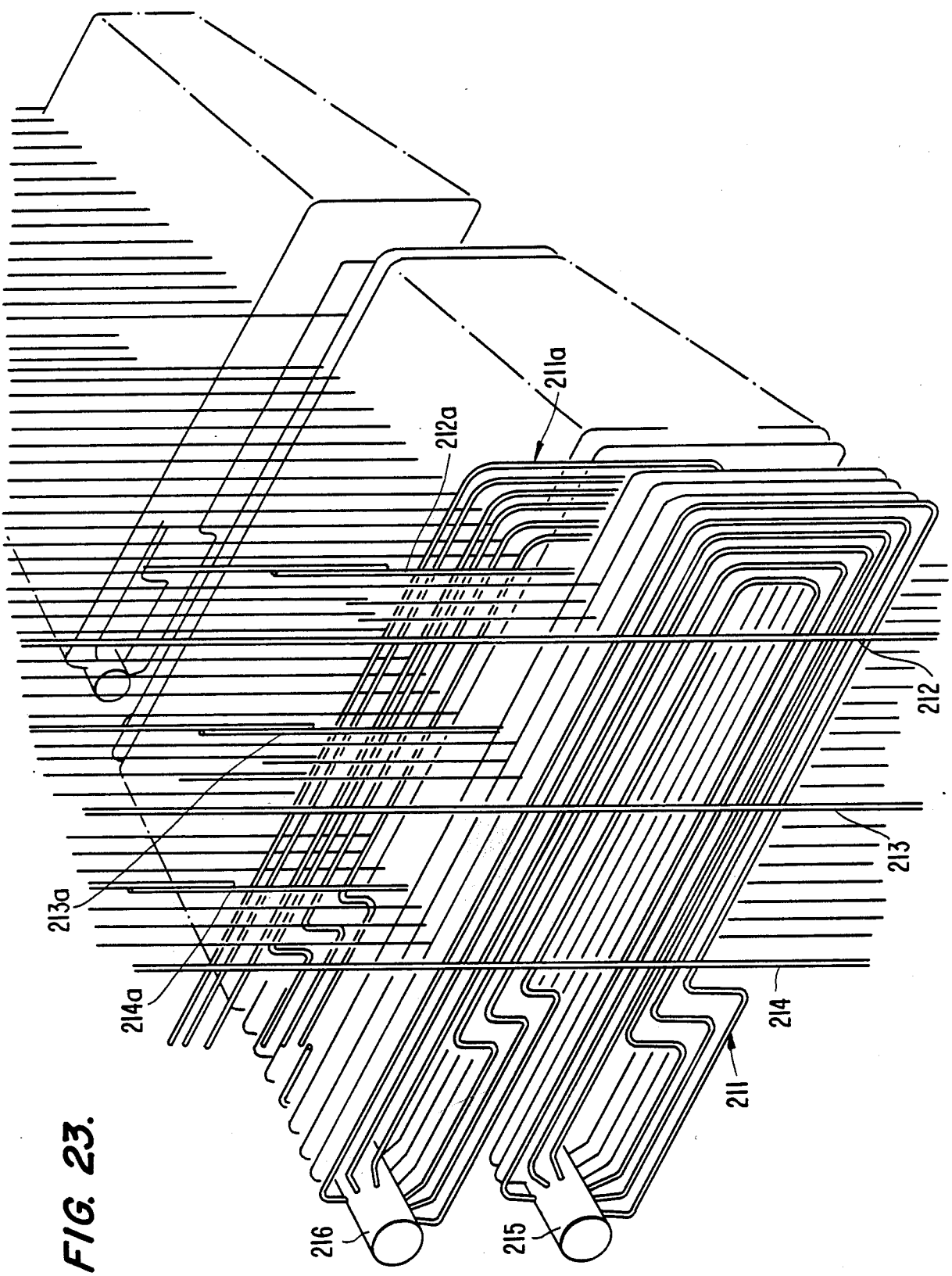
FIG. 23 is a general perspective view for a superheater in a boiler to be used for explaining a repairing work in the prior art.
Figure 24:
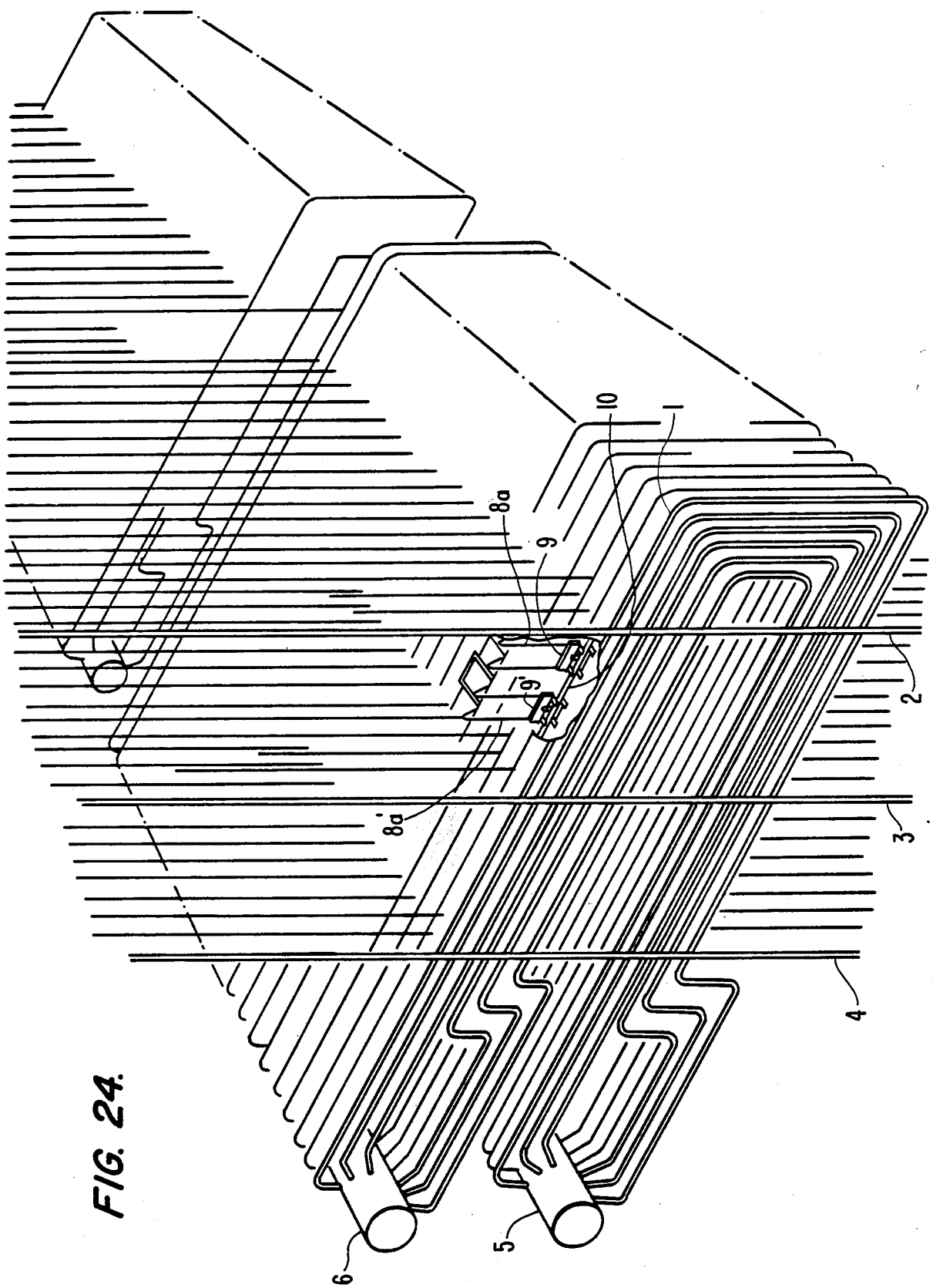
FIG. 24 is a perspective view showing another preferred embodiment of the present invention.

As shown in FIG. 22, a pair of fixing jigs 221 are inserted into a gap space between adjacent superheater panels 221, and respectively fixed to the opposite end portions of an object tube, and welding devices 223 are fixedly mounted respectively on the both fixing jigs 221.

Figure 21:
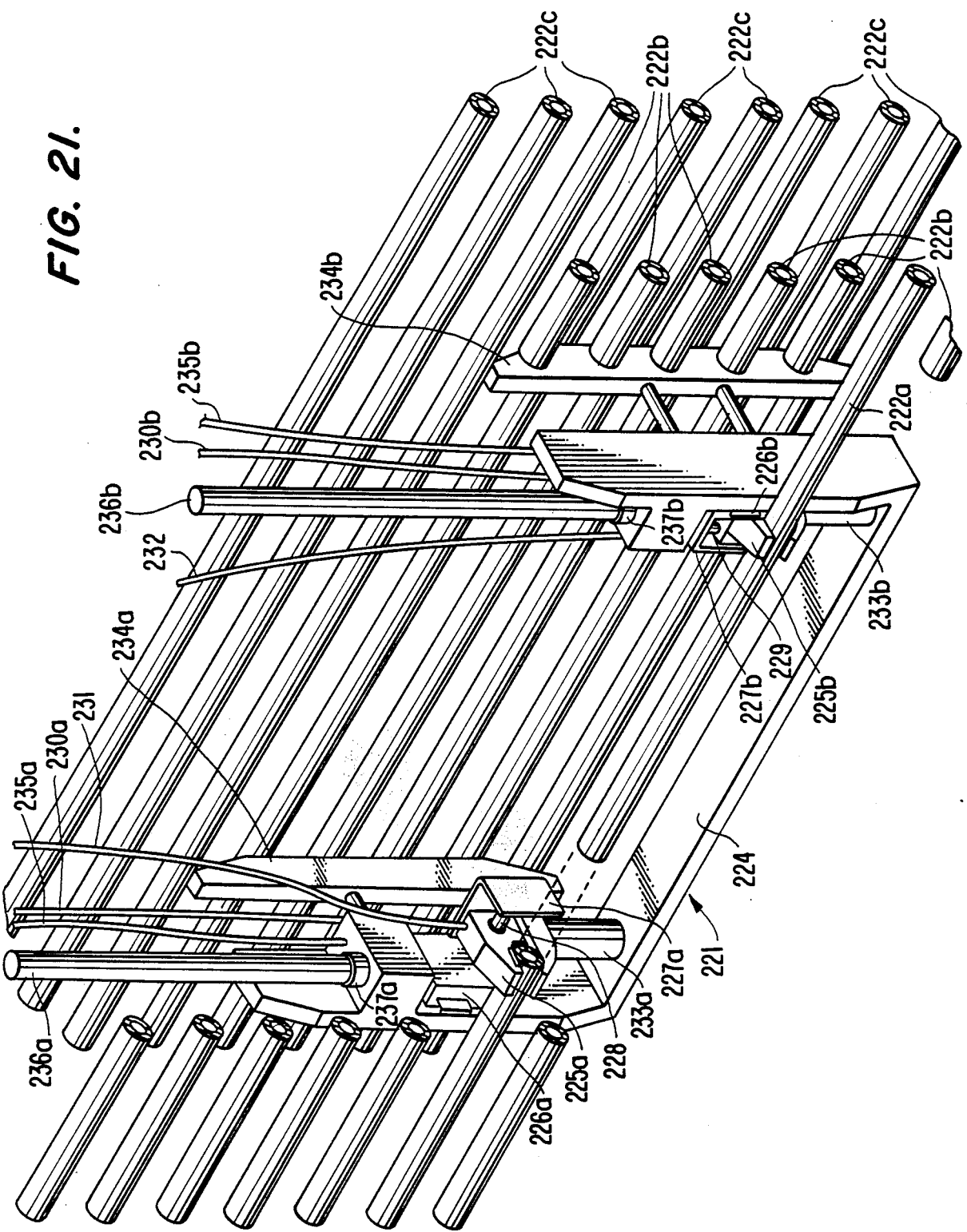
FIG. 21 is a perspective view showing the state where the same fixing jig is fixedly secured to a tube in a boiler superheater.

At first, description will be made on the construction of the fixing jig 221 for fixing the welding device 223 at a desired position, with reference to FIG. 21. In FIG. 21, reference numeral 222a designates an object tube to be welded, numeral 222b designates tubes included in the same panel as the welding object tube 222a, and numeral 222c designates tubes in a panel adjacent to the panel including the welding object tube 222a. The fixing jig 221 has a U-shaped main body frame 224, and clamps 225a and 225b for respectively gripping the object tube are mounted to the side walls at the opposite ends of the main body frame. One clamp 225a is mounted via a left and right moving mechanism 228 to a bracket 227a which is in turn mounted via a back and forth moving mechanism 226a to one side wall of the main body frame 224, while the other clamp 225b is mounted via a vertical moving mechanism 229 to a bracket 227b which is in turn mounted via a back and forth moving mechanism 226b to the other side wall of the main body frame 224. To these back and forth moving mechanisms 226a and 226b, left and right moving mechanism 228 and vertical moving mechanism 229 are connected back and forth driving flexible shafts 230a and 230b, a left and right driving flexible shaft 231 and a vertical driving flexible shaft 232, respectively, and the respective moving mechanisms 226a, 226b, 228 and 229 are adapted to be driven by manipulating these flexible shafts 230a, 230b, 231 and 232. In addition, to the clamps 225a and 225b are mounted hydraulic cylinders 223a and 223b, respectively, for driving them to open and close. Furthermore, to the opposite side walls of the main body frame 224 are mounted projecting plates 234a and 234b so as to be movable in the back and forth directions, and the projecting plates 234a and 234b are adapted to be driven by projecting plate driving flexible shafts 235a and 235b, respectively, connected thereto. In addition, guide bars 236a and 236b for the welding device 223 which extend in the vertical direction are fixedly secured to the opposite side walls of the main body frame 224, and stoppers 237a and 237b are mounted at the base portions of the guide bars 236a and 236b.

Now the construction of the welding device 223 will be explained with reference to FIGS. 18 to 20. As shown in FIG. 20, the casing of the welding device 223 consists of a base plate 238 and a cover 239, a holding plate 240 bridging the guide bars 236a and 236b of the above-mentioned fixing jig 221 is fixedly secured to the base plate 238, and by detachably engaging guide rollers 241a and 241b mounted at the opposite ends of the holding plate 240 with the respective guide bars 236a and 236b, the welding device 223 can be mounted in a slidable manner along the guide bars 236a and 236b.

Figure 18:
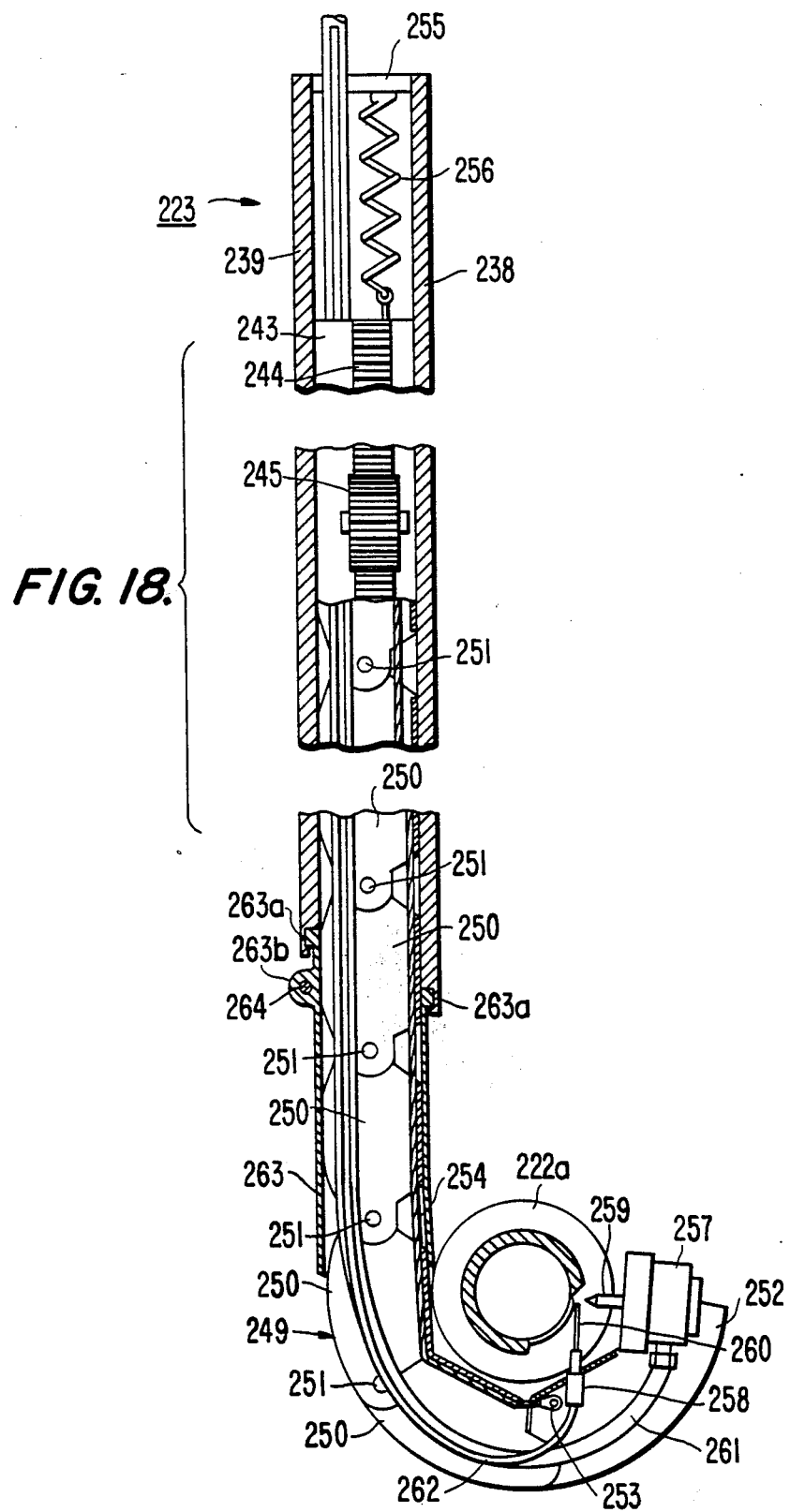
FIG. 18 is a longitudinal cross-sectional view of a welding device according to one preferred embodiment of the present invention.
Figure 19:
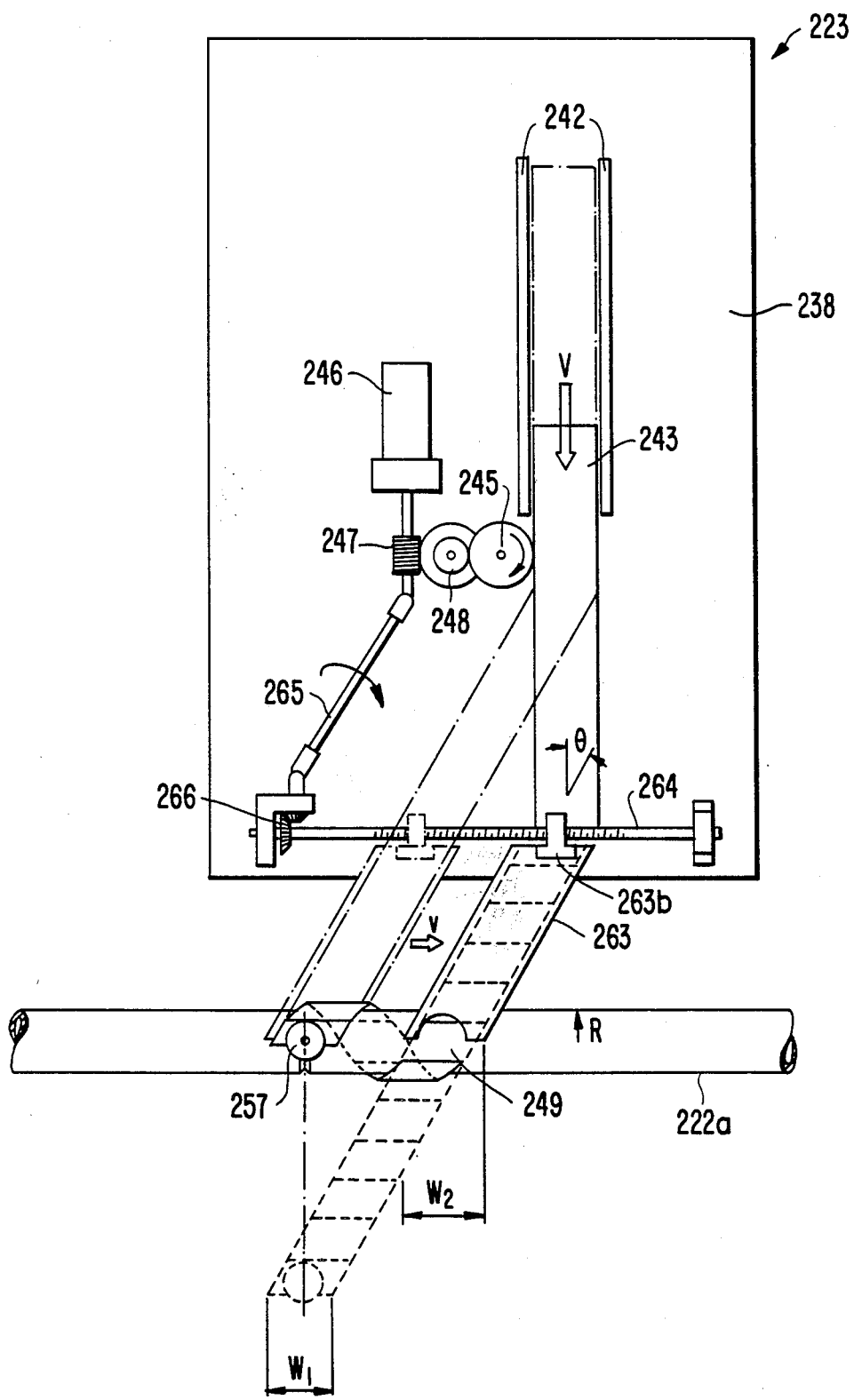
FIG. 19 is a front view showing a general construction of the same welding device.
Figure 20:
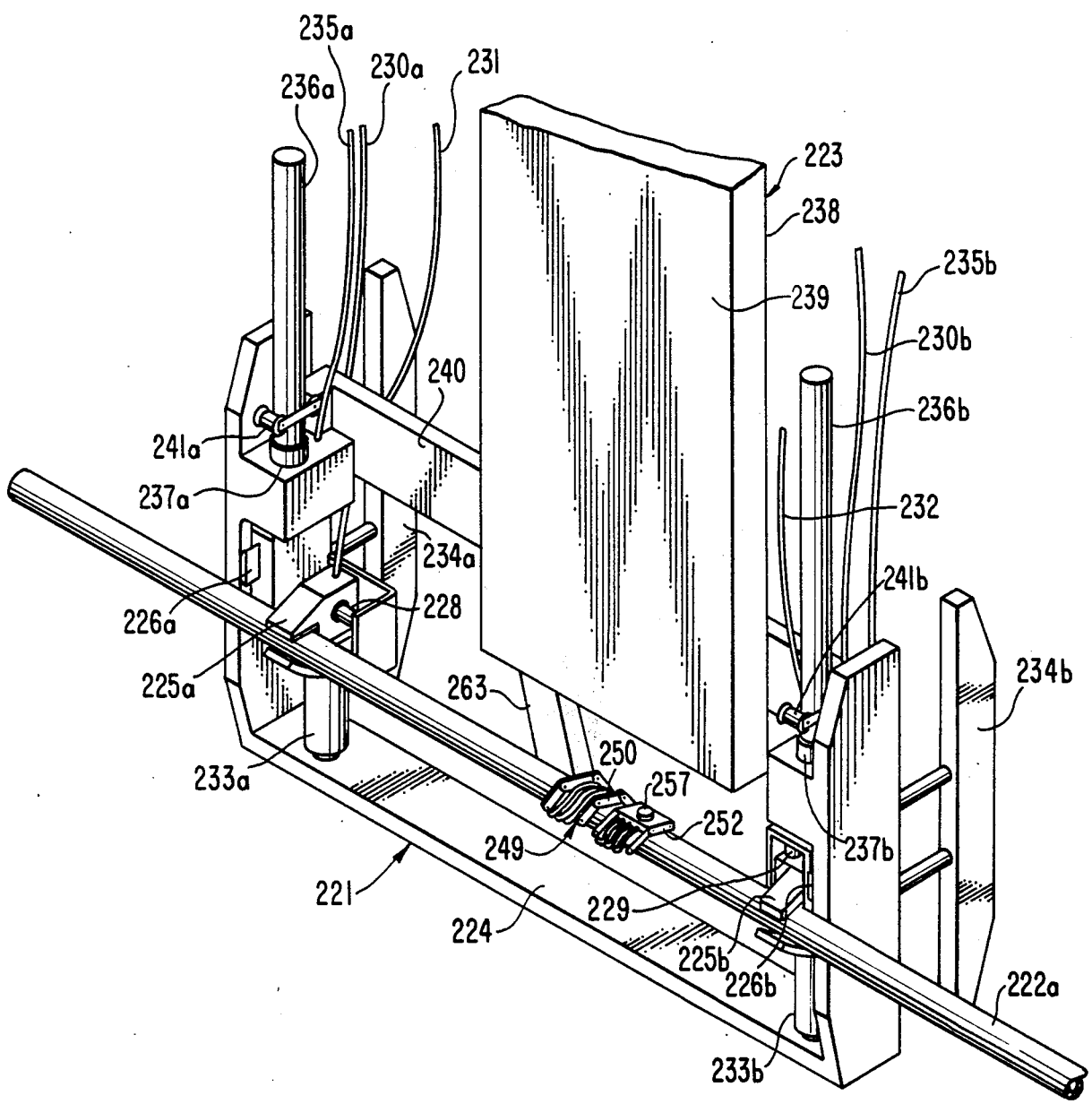
FIG. 20 is a perspective view showing one example of the state of use of the same welding device as mounted on a fixing jig.

In addition, as shown in FIGS. 18 and 19, a pair of guide plates 242 are fixed on the base plate 238, and within the space surrounded by the guide plates 242, the base plate 238 and the cover 239 is supported a slide rod 243 so as to be slidable in the vertical direction as viewed in the figure. To the slide rod 243 is fixedly secured a rack 244 as directed in the vertical direction, a pinion 245 is meshed with the rack 244, and the slide rod 243 is adapted to be driven in the vertical direction in response to the pinion 244 being rotationally driven by a motor 246 fixed to the base plate 238, by the intermediary of a worm gear 247 and an intermediate gear 248.

To the bottom of the slide rod 243 is connected a freely bendable arm 249 which extends to the below of the casing. The arm 249 consists of a large number of articular bodies 250 pivotably coupled with one another via pins 251, the axial direction of the pins 251 makes a right angle with respect to the direction of movement of the slide rod 243, and as shown in FIG. 19, the respective articular bodies 250 are coupled with one another in an array inclined by a predetermined angle $\theta$ with respect to the direction of movement of the slide rod 243. To the articular body 250 at the tip end of the arm 249 is mounted a torch holder 252, and one end of a drawing cable 254 is fixed to the torch holder 252 by means of a fixing metal 253. The drawing cable 254 extends along the respective articular bodies 250 and is led into the casing, and the other end of the drawing cable 254 is connected to a tension spring 256 having its remote end fixed to a spring fixing table which is fixed as bridging the base plate 238 and the cover 239. Accordingly, the respective articular bodies 250 are energized so as to be rotated in one direction by the drawing cable 254 which is tensioned by the tension spring 256, and thereby, under an unconstrained condition, the arm 249 is adapted to be bent in a spiral form with a lead angle $\theta$ about an axis perpendicular to the direction of movement of the slide rod 243.

In addition, a TIG welding torch 257 and a filler wire tip holder 258 are fixed to the torch holder 252, and a tungsten electrode 259 and a filler wire 260 mounted in these members are adapted to aim at a welding position. Also, a cable hose 261 and a conduit cable 262 for feeding electric power and inert gas are connected to the TIG welding torch 257 and the filler wire tip holder 258, and they are led along the arm 249 into the casing, then led out from the top of the casing, and connected to necessary apparatuses not shown.

On the other hand, under the casing is provided a sheath 263 which accommodates the arm 249 therein to guide the arm 249 from the casing to the object tube 222a. The sheath 263 is inclined by the same angle $\theta$ as the arm 249 with respect to the direction of movement of the slide rod 243, and the sheath 263 is mounted to the base plate 238 and the cover 239 so as to be freely slidable in the left and right directions as viewed in FIG. 19, by the fact that projections 263a formed at its top portions are slidably fitted in grooves formed in the base plate 238 and the cover 239 as directed in the left and right directions as viewed in FIG. 19 at right angles to the direction of movement of the slide rod 243 (in the direction perpendicular to the plane of the sheet as viewed in FIG. 18). On the sheath 263 is formed a feed nut portion 263b, and a feed screw 264 rotatably supported from the casing as directed in the left and right directions as viewed in FIG. 19, is threadedly mated with the feed nut portion 263b. The feed screw 264 is coupled to the above-described motor 246 for driving the slide rod 243, by the intermediary of a worm gear 247, a connecting rod 264 and a bevel gear mechanism 266, so that the sheath 263 can be moved in the left and right directions as viewed in FIG. 19 when it is driven by the motor 246. In other words, the drive for the slide rod 243 and the drive for the sheath 263 are effected by the same motor 246. Here, representing the moving velocity of the slide rod 243 by V, the moving velocity of the sheath 263 by v and the inclination angle of the arm 249 and the sheath 263 with respect to the direction of movement of the slide rod 243 by $\theta$ as shown in FIG. 19, the gear ratios of the above-described transmission mechanism are selected so as to fulfil the relation of $v/V = \tan \theta$.

Now description will be made on the operation of the above-described apparatus. At first, the fixing jig 221 is fixed at the position opposed to the object tube 222a to be welded in the superheater panel. To that end, with the clamps 225a and 225b and the projecting plates 234a and 234b of the fixing jig 221 preliminarily kept retracted to the inside, the fixing jig 221 is inserted between adjacent superheater panels 221, and the clamps 225a and 225b are made to oppose to the welding object tube 222a. Subsequently, when the projecting plates 234a and 234b are expanded by manipulating the projecting plate driving flexible shafts 235a and 235b, the fixing jig 221 is fixed between the superheater panels by pressing the array of tubes 222b and the array of tubes 222c with the main body frame 224 and the projecting plates 234a and 234b, respectively. Next, the clamps 225a and 225b are advanced by manipulating the back and forth driving flexible shaft 230a and 230b, and if the hydraulic cylinders 233a and 233b are actuated, then the clamps 225a and 225b grip the welding object tube 222a, so that the welding object tube 222a can be fixed with respect to the fixing jig 221.

Then, the guide rollers 241a and 241b of the welding device 223 are respectively fitted to the guide bars 236a and 236b of the fixing jig 221 that has been fixed between the superheater panels 211, and the welding device 223 is lowered along the guide bars 236a and 236b to insert it between the superheater panels 211. During this period, by disposing the slide rod 243 of the welding device 223 at its upper position with the arm 249 kept accommodated within the sheath 263, the welding device 223 can be smoothly inserted without interference between the arm 249, torch holder 252 and TIG welding torch 257 and the superheater panels 211. The welding device 223 is fixed to the fixing jig 221 when it strikes against the stoppers 237a and 237b and stops, and provision is made such that at this position the tip of the sheath 263 of the welding device 223 just engages with the welding object tube 222a.

Under this condition, if the motor 246 is started, then the slide rod 243 is lowered and the arm 249 is paid out downwards through the sheath 263 (in the direction at right angles to the axial direction of the welding object tube 222a). While the arm 249 is held in a rectilinear form by the sheath 263 until it comes out of the sheath 263, since the articular bodies 250 are always energized by the drawing cable 254 so as to rotate about the pins 251 towards the side of the drawing cable 254 as described previously, as soon as the articular body 250 of the arm 249 comes out of the sheath 263, the articular body 250 would rotate until it comes into contact with the surface of the welding object tube 222a. In this way, as the successive articular bodies 250 are paid out of the sheath 263, they would come into contact with the surface of the welding object tube 222a, hence, eventually the arm 249 would wind itself around the welding object tube 222a, and jointly with the torch holder 252 mounted at the tip end of the arm 249, the TIG welding torch 257 and the filler wire tip holder 258 would revolve along the circumferential surface of the welding object tube 222a. During this period, since the arm 249 is inclined by the angle $\theta$ with respect to the direction of movement of the slide rod 243, the arm 249 would wind itself around the welding object tube 222a in a spiral form having a lead angle $\theta$, and so, even in the case where the arm wound itself by more than one revolution, interference between adjacent portions of the arm 249 can be prevented. More particularly, as shown in FIG. 19, assuming that the width of the arm 249 measured along the axial direction of the welding object tube 222a is represented by $W_1$, the similar width of the sheath 263 is represented by $W_2$, and the outer radius of the welding object tube 222a is represented by R, the arm 249 can wind itself around the welding object tube 222a by a plurality of revolutions without interference between the adjacent portions of the arm 249, provided that the following relation is fulfilled:

$$2\pi R \tan \theta > W_1 + \frac{W_2 - W_1}{2} = \frac{W_1 + W_2}{2}.$$

It is to be noted that when the articular bodies 250 have wound themselves round, although the transverse cross section of them presents a polygonal shape, in the above calculation this cross-sectional shape was approximated by a circle and the thickness of the articular bodies 250 was disregarded. On the other hand, when the motor 246 is started, the sheath 263 moves in the direction at right angles to the direction of movement of the slide rod 243, that is, in the axial direction of the welding object tube 222a, in synchronism with the lowering of the slide rod 243. At this time, since the moving velocity of the slide rod 243 is V and, the moving velocity v of the sheath 263 and the inclination angle $\theta$ of the arm 249 with respect to the sheath 263 fulfil the relation of $v/V = \tan \theta$ as described previously, the arm 249 can smoothly move through the sheath 263.

In addition, in FIG. 19, the state of the slide rod 243 and the arm 249 upon commencement of lowering is shown by dot-dash lines, and the state of the arm 249 in the case where it is assumed that after lowering the arm 249 does not wind itself around the welding object tube 222a is shown by dash lines. As will be apparent from FIG. 19, in the case where it is assumed that the arm 249 does not wind itself round, a locus of movement of the TIG torch 257 mounted at the tip end of the arm 249 is parallel to the direction of movement of the slide rod 243, that is, it is perpendicular to the axial direction of the welding object tube 222a. Furthermore, since the respective rotational axes of the respective articular bodies 250 in the arm 249 are directed at right angles to the direction of movement of the slide rod 243, that is, in parallel to the axial direction of the welding object tube 222a, when the arm 249 is being paid out and winding itself around the welding object tube 222a, the TIG welding torch 257 mounted at the tip end of the arm 249 would revolve along the outer circumference of the welding object tube 22a in a plane perpendicular to its axial direction. Accordingly, by actuating the TIG welding torch 257 simultaneously with the start of the motor 246, circumferential welding of the welding object tube 222a can be accomplished.

It is to be noted that while the arm 249 is energized so as to be bent by means of the drawing cable 254 in the above-described embodiment, alternatively provision could be made, for example, such that the arm 249 may be bent by mounting springs adapted to energize the respective articular bodies 250 so as to rotate in one direction, at the respective pivotal coupling portions of the articular bodies 250. Also, while the above description was made with respect to an example in which the present invention was applied to a superheater in a boiler, it is possible to apply the present invention to circumferential welding of a rod-shaped body in reheater, a heat-exchanger, a reinforcement or the like.

As described in detail above in connection to one preferred embodiment, according to the third aspect of the present invention, since circumferential welding of an object to be welded can be accomplished by moving an arm up to the object to be welded with the arm kept stretched and then winding the arm spirally around the object to be welded, circumferential welding of a rod-shaped body within a narrow space can be achieved by remote manipulation. Accordingly, if the welding device according to the present invention is used, even for a damaged location to which a worker cannot make access and which is positioned at the central portion of a thickly crowded group of tubes, for example, in a superheater of a boiler, it is possible to carry out repair welding without cutting sound locations, hence the expense and time spent for the repair work can be greatly reduced, and moreover, degradation of quality of the object products can be suppressed to a minimum.

Figure 25:
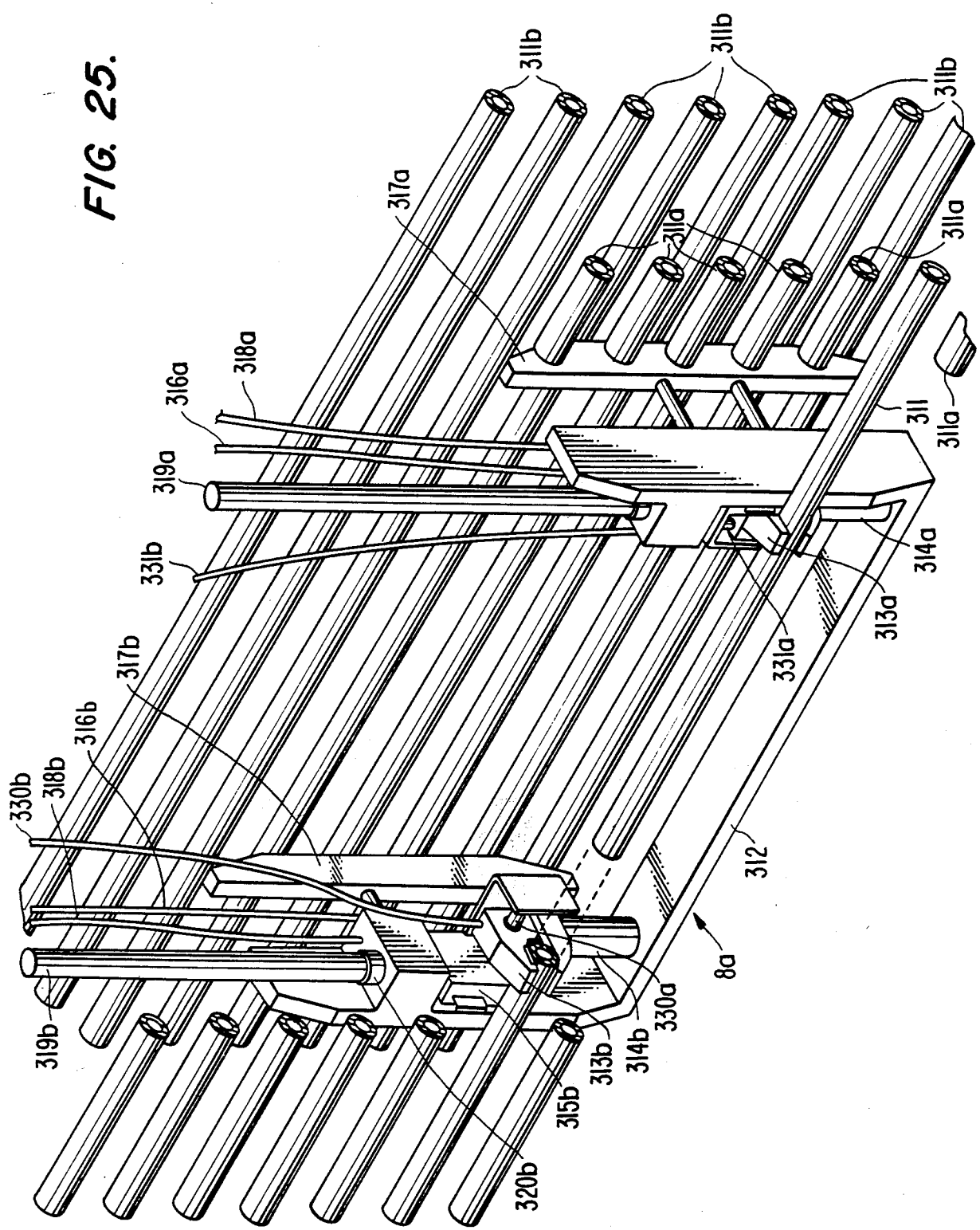
FIG. 25 is an enlarged perspective view showing a fixing jig in the same preferred embodiment.

Now, a fourth aspect of the present invention will be explained in connection to one preferred embodiment illustrated in the accompanying drawings. In FIGS. 24, 25, 26, 27 and 28, several hundreds of superheater panels 1 are supported as suspended by pendant pipes 2, 3 and 4, and the respective tubes forming each one of the panels 1 are secured by welding to an inlet header 5 and an outlet header 6. Two pairs of fixing jigs 8a and 8a' as will be described later are respectively inserted into the gap space between the above-mentioned panels 1 at the positions on the opposite sides of a damaged location 10 of the object tube 311 to be cut as will be described later, among the above-mentioned tubes, to make the fixing jigs 8a and 8a' respectively firmly grip the object tube 311. Subsequently, cutting machines 9 and 9' as will be described later are fixedly mounted to the fixing jigs 8a and 8a' on the respective sides, and the object tube 311 are cut at two positions in the respective fixing jigs 8a and 8a' on the opposite sides of the damaged location 10. Each of the fixing jigs 8a and 8a' (See FIG. 24) is formed in a symmetric configuration as shown in FIG. 25, and the cutting object tube 311 forms one panel jointly with other tubes 311a, and this panel is adjacent to another panel formed of other tubes 311b. The fixing jig includes a jig main body frame 312 having clamps 313a and 313b disposed at its opposite ends so that they can arbitrarily grip the tube. Projecting plates 317a and 317b are mounted to the main body frame in an expansible and contractible manner so that they can be arbitrarily expanded and contracted by manipulating flexible shafts 318a and 318b, respectively. The gripping and releasing operations of the clamps are arbitrarily effected by means of hydraulic or pneumatic cylinders 314a and 314b, and in addition, moving mechanisms 315a and 315b for moving the clamps 313a and 313b back and forth with respect to the main body frame 312 are driven by flexible shafts 316a and 316b, respectively, so as to be moved arbitrarily. On the opposite sides of the main body frame 312 are disposed guide bars 319a and 319b, respectively, as standing therefrom, and at the ends of the guide bars 319a and 319b are mounted stoppers 320a and 320b for positioning the cutting machine 9 and 9' as will be described later. Furthermore, a left and right moving mechanism 330a for moving the clamp in the left and right directions is driven by a flexible shaft 330b to make the clamp arbitrarily movable, and a vertical 14 moving mechanism 331a for moving the clamp vertically is driven by a flexible shaft 331b to make the clamp arbitrarily movable.

Figure 26:
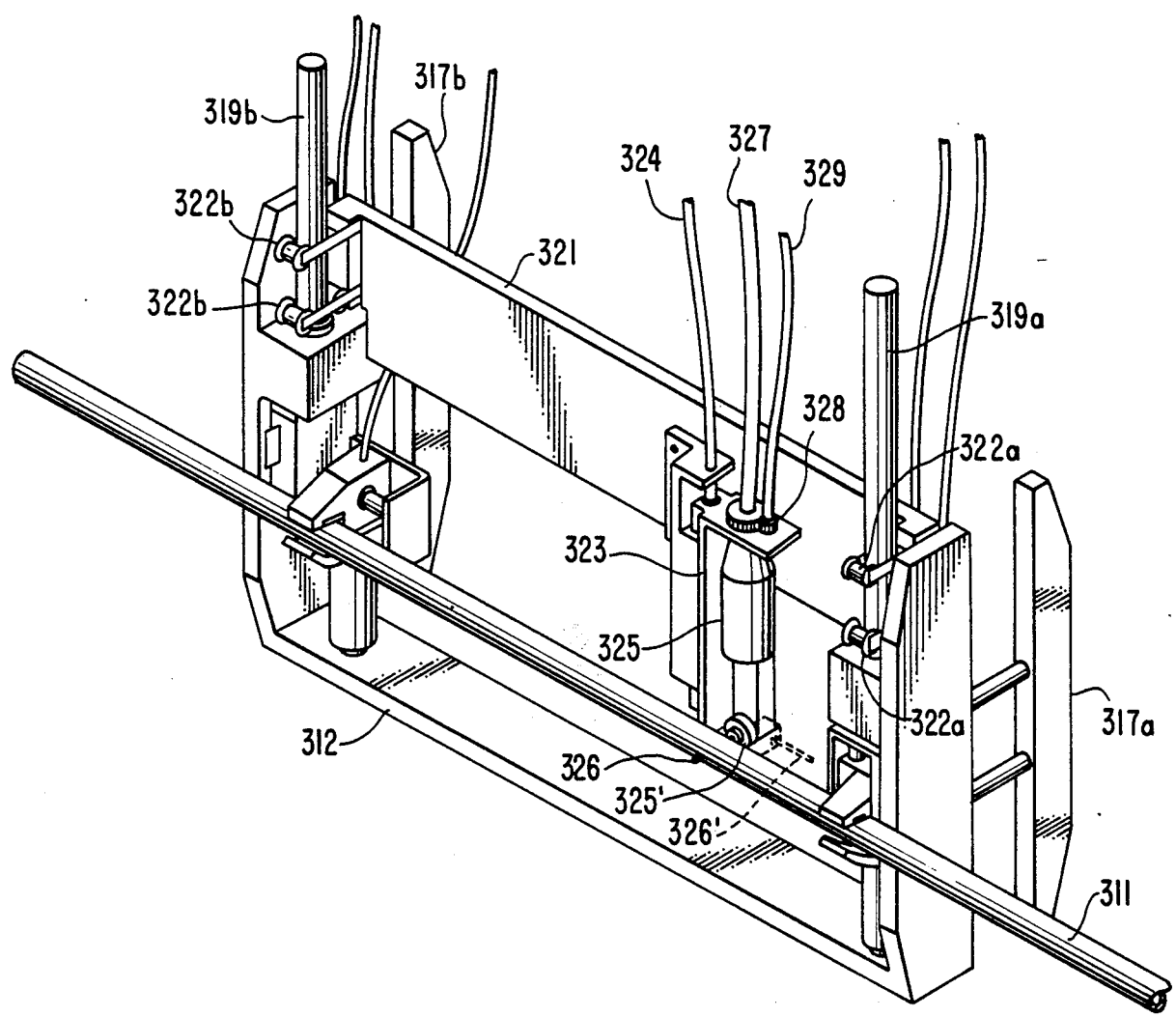
FIG. 26 is an enlarged perspective view showing the same fixing jig and a cutting machine.
Figure 28:
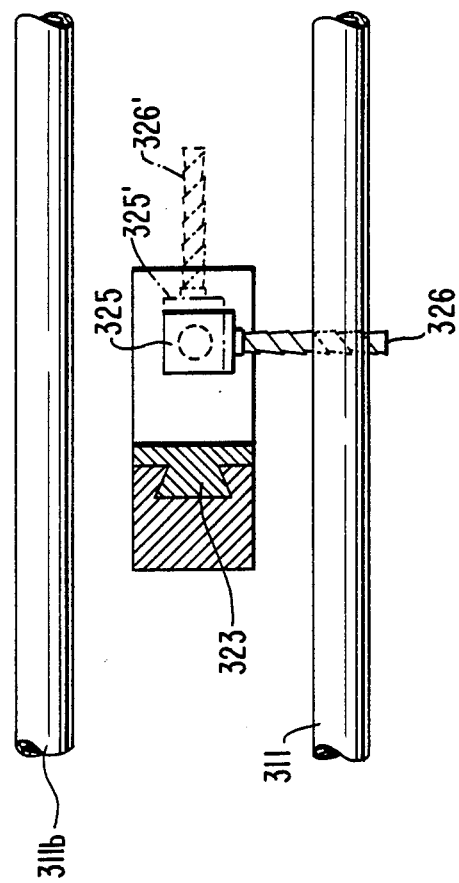
FIG. 28 is a cross-sectional view taken along line B—B in FIG. 27 as viewed in the direction of arrows.
Figure 27:
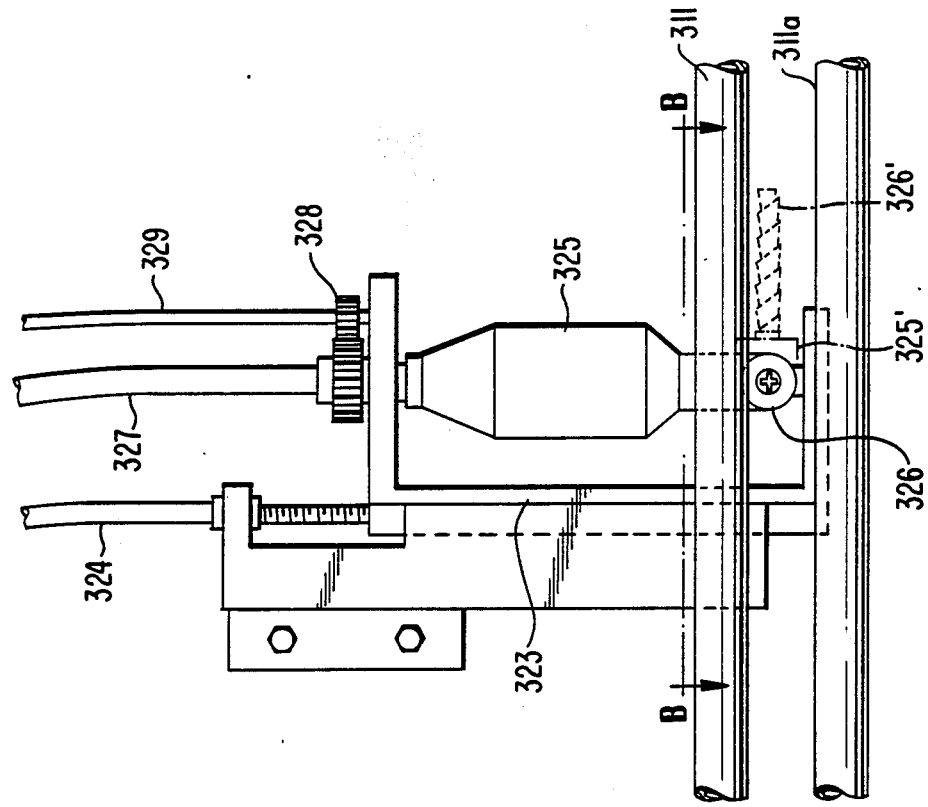
FIG. 27 is a front view showing an essential part in the proximity of a vertically moving table in the same cutting machine.
Figure 29:
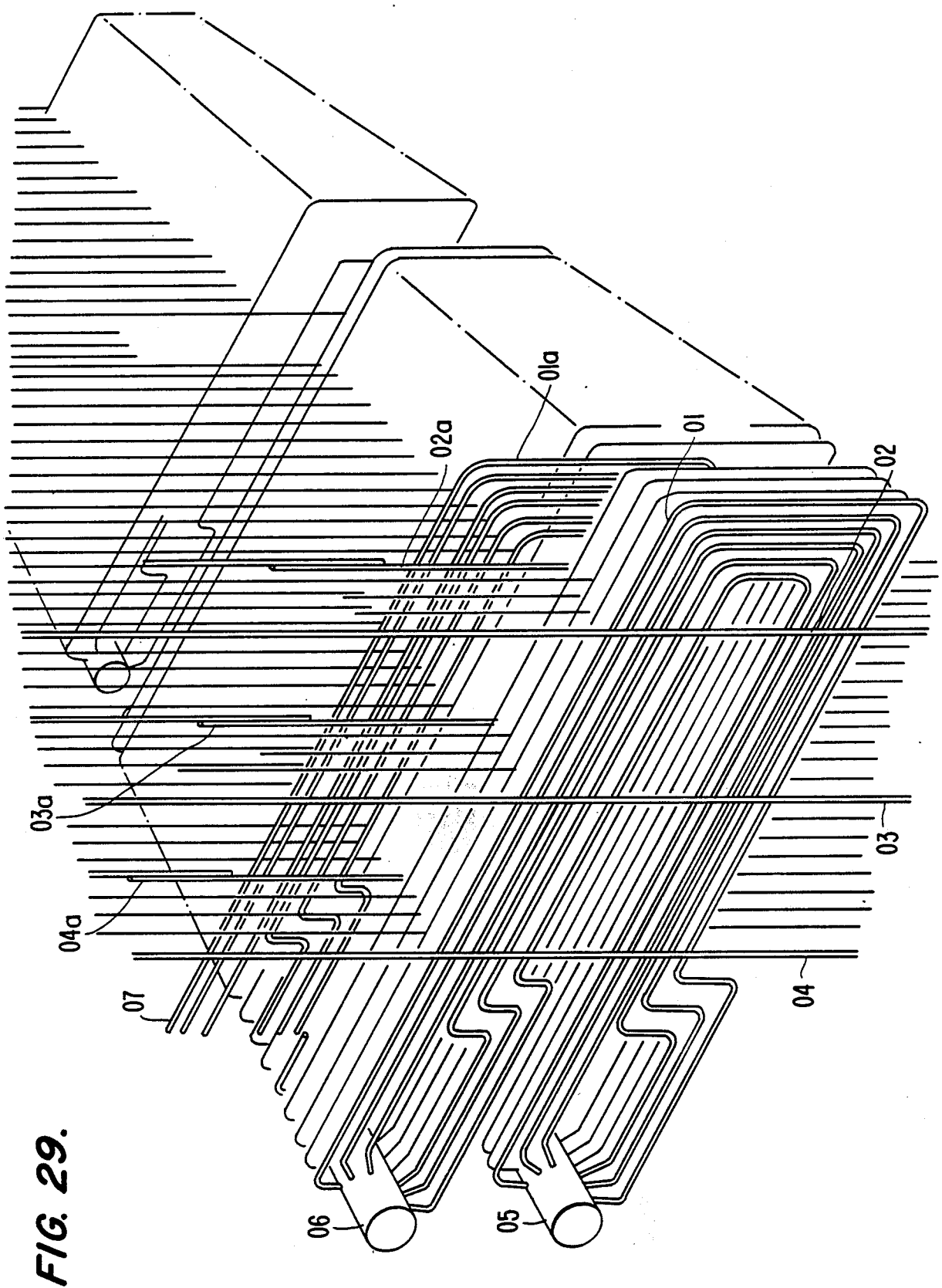
FIG. 29 is a perspective view of superheater panels in the prior art.

In each of the cutting machines 9 and 9', as shown in FIGS. 26, 27 and 28, a vertical 14 moving table 323 is disposed on a cutting machine base plate 321 having a pair of guide rollers 322a and 322b disposed at its opposite ends, so as to be arbitrarily moved vertically by manipulating a flexible shaft 324, on the vertical 14 moving table 323 is rotatably mounted a pneumatic motor 325 having an end mill 326 mounted at its tip end and connected with a driving air hose 327, the rotational movement of the pneumatic motor 325 is arbitrarily effected by driving a gear mechanism 328 associated with the motor through a flexible shaft 329, and thereby, upon rotating the pneumatic motor 325 and the end mill 326, they are moved to the positions of the pneumatic motor 325' and the end mill 326' shown by dotted lines. Therefore, upon cutting the tube 311, the vertical moving table 323 is lowered through the space between the adjacent panels without interfering with the tubes 311a and 311b in the respective panels, down to the position where the end mill 326' is located underside of the cutting object tube 311, and thereafter, the pneumatic motor 325 and the end mill 326 is rotated by 90° so that the end mill 326 may be engaged with the underside of the cutting object tube 311.

Now description will be made on a cutting work for the cutting object tube 311 by making use of the above described fixing jig 8a and cutting machine 9. At first, to mount the fixing jig 8a, as shown in FIG. 25, after the clamps 313a and 313b and the projecting plates 317a and 317b have been retracted, respectively, the fixing jig 8a is inserted into the space between a superheater panel 1 including the cutting object tube 311 and the adjacent superheater panel 1 until the clamps 313a and 313b are opposed to the cutting object tube 311, and subsequently the projecting plates 317a and 317b are expanded by manipulating the flexible shafts 318a and 318b, so that the array of tubes 311a and the array of tubes 311b in the adjacent panels 1 are pressed by the projecting plates 317a and 317b and the main body frame 312. Then the fixing jig 8a has been fixed with respect to the superheater panels 1. Next, after the clamps 313a and 313b have been advanced by manipulating the flexible shafts 316a and 316b, the hydraulic cylinders 314a and 314b are actuated to make the clamps 313a and 313b firmly grip the cutting object tube 311.

Subsequently, upon mounting the cutting machine 9 on the fixing jig 8a, as shown in FIG. 26, the fixing jig 8a is inserted into the space between the adjacent superheater panels 1 with the guide rollers 322a and 322b of the cutting machine 9 fitted to the guide bars 319a and 319b. During that period, as noted previously, the insertion is effected after the pneumatic motor 325 and the end mill 326 have been rotated by 90° so as not to interfere with the superheater panels 1, hence the insertion can be achieved smoothly, and if the cutting machine 9 is inserted until it reaches the stoppers 320a and 320b on the guide bars 319a and 319b and stops, then the cutting machine 9 is fixed to the fixing jig 8a. Since the distance between the clamp and the stopper is preliminarily known, it is possible to adjust the vertical moving table 323 in such manner that at the fixed position of the cutting machine 9, the end mill 326 may come to the level between the cutting object tube 311 and the next lower tube 311a in the same panel. Thereafter, when the pneumatic motor 325 has been rotated by 90° by manipulating the flexible shaft 329, the end mill 326 is inserted between the above-mentioned tubes 311 and 311a and is engaged with the cutting object tube 311 in perpendicular to the center axis of the object tube 311, and therefore, if the vertical moving table 323 is moved upwards while the pneumatic motor 325 is being rotated jointly with the end mill 326 by air fed through the driving air hose 327, then the end mill can cut the cutting object tube 311 through a milling operation. The mounting of the above-described fixing jigs and the cutting machines as well as the cutting work all can be achieved by remote manipulations.

As described above, according to the present invention, during repair work in a thickly crowded group of tubes, cutting and removal of a damaged tube portion can be achieved by remote manipulation, and hence it becomes unnecessary to perform the repair work by cutting even sound portions as is the case with the work in the prior art. Therefore, the expense and labor for the repair work can be greatly reduced, and moreover, degradation of quality and reduction of reliability after repair can be suppressed to a minimum. Thus, industrial usefulness of the present invention is extremely high.

Since many changes and modifications can be made to the above-described constructions without departing from the spirit of the present invention, it is intended that all matter contained in the above-description and illustrated in the accompanying drawings shall be interpreted to be illustrative and not as a limitation to the scope of the invention.

What is claimed is:

1. An apparatus, comprising:
   a frame to be inserted into a structure;
   clamp means, including a pair of clamps on said frame, for clamping a member in the structure;
   means, including projecting plates, for releasably fixing with said projecting plates said frame with respect to the structure such that said frame and said releasably fixing means are releasably supported by the structure, said releasably fixing means including projecting plate positioning means for respectively projecting said projecting plates away from said frame into contact with the structure and retracting said projecting plates toward said frame;
   clamp positioning means for advancing said clamps away from said frame toward the member and retracting said clamps away from the member toward said frame;
   first and second guide bars mounted on said frame;
   a base plate having first and second guide rollers fixed to opposite ends thereof, respectively rollably fitted to said first and second guide bars, whereby said base plate is rollable along said guide bars; and
   working means, rotatably and movably mounted on said base plate.

2. An apparatus as in claim 1, wherein said guide bars extend parallelly in laterally spaced relation to each other, said projecting plate positioning means comprising means for projecting and retracting said projecting plates in directions perpendicular to the direction of extent of said guide bars.

3. An apparatus as in claim 2, wherein said guide bars comprise means for guiding said base plate and said working means into the structure onto said frame.

4. An apparatus as in claim 1, wherein said guide bars comprise means for guiding said base plate and said working means into said structure onto said frame.

5. An apparatus as in claim 1, wherein said working means includes means for treating an object in the structure.

6. An apparatus as in claim 5, wherein said working means includes a tool engageable with the object to be treated, said tool being retractably pivotable away from said base plate toward the object to be treated for engagement therewith.

7. An apparatus as in claim 5, wherein said means for treating comprises means for one of cutting, welding and beveling the object to be treated.

8. An apparatus as in claim 7, wherein said means for treating further comprises a support mounted on said base plate for movement along a longitudinal axis; an end mill having a rotary shaft; rotational drive means, mounted on said support for longitudinal movement therewith and rotation about said longitudinal axis, for rotating said rotary shaft about a rotary shaft axis, said rotary shaft being oriented so as to rotate in a plane perpendicular to said longitudinal axis when said rotational drive means rotates about said longitudinal axis; and means for remotely controlling longitudinal movement of said support, rotary movement of said rotary shaft and rotation of said rotational drive means about said longitudinal axis.

9. An apparatus as in claim 1, wherein said working means includes means for treating the member in the structure while clamped by said clamping means.

10. An apparatus as in claim 1, wherein said clamping means includes means for clamping with said pair of clamps a tube to be treated located in said structure, said releasably fixing means including means for releasably fixing with said projecting plates said frame with respect to a group of tubes of the structure such that said frame and said releasably fixing means are releasably supported by the group of tubes, said projecting plate positioning means including means for respectively projecting said projecting plates away from said frame into contact with the group of tubes and retracting said projecting plates toward said frame, said working means comprising means for treating the tube to be treated.

11. An apparatus as in claim 10, wherein said releasably fixing means includes means for pressing said projecting plate against a plurality of the group of tubes spaced from the tube to be treated.

12. An apparatus as in claim 1, wherein said clamp positioning means and said projecting plate positioning means respectively advance said clamps and project said projecting plates in opposite directions on opposite sides of said frame, said clamps being spaced apart in a clamp spacing direction perpendicular to said opposite directions, said guide bars extending in a guide bar direction perpendicular to said opposite directions and said clamp spacing direction.

13. An apparatus as in claim 12, further comprising means for moving said clamps relative to said frame in said clamp spacing direction and said guide bar direction.

14. An apparatus, comprising:
a frame to be inserted in a structure;
clamp means, including a pair of clamps on said frame, for clamping a member in the structure;
means, including projecting plates, for releasably fixing with said projecting plates said frame with respect to the structure, said releasably fixing means including projecting plate positioning means for respectively projecting said projecting plates away from and retracting said projecting plates toward said frame;
clamp positioning means for advancing said clamps away from said frame toward the member and retracting said clamps away from the member toward said frame;
first and second guide bars mounted on said frame;
a base plate having first and second guide rollers fixed to opposite ends theeof, respectively rollably fitted to said first and second guide bars, whereby said base plate is rollable along said guide bars; and
working means, rotatably and movably mounted on said base plate, for treating an object in the structure, said working means comprising a welding device for welding the object to be treated, said welding device including
an arm fromed of a plurality of articular bodies successively pivotably joined to each other in a freely bendable manner,
means for energizing said articular bodies to rotate in one direction so that said arm spirals around the object,
a welding torch mounted to a tip end of said arm,
means, including a sheath, for guiding said arm to the object,
first drive means for moving said arm inclined by a lead angle o of the spiral toward the object, in a direction perpendicular to the direction of extent of the object at a velocity V, and
second drive means for moving said shealth in said direction of extent at a velocity v in the direction of the lead of said spiral in synchronism with the movement of said arm, such that the velocity v is equal to V tan o.

15. An apparatus as in claim 14, wherein said clamping means comprises means for clamping the object to be welded with said pair of clamps.

* * * * *